(12) United States Patent
Nomura et al.

(10) Patent No.: US 10,048,507 B2
(45) Date of Patent: *Aug. 14, 2018

(54) IMAGING APPARATUS

(71) Applicant: HOYA CORPORATION, Tokyo (JP)

(72) Inventors: Hiroshi Nomura, Saitama (JP); Toshiki Nakamura, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 406 days.

This patent is subject to a terminal disclaimer.

(21) Appl. No.: 14/925,026

(22) Filed: Oct. 28, 2015

(65) Prior Publication Data

US 2016/0062136 A1 Mar. 3, 2016

Related U.S. Application Data

(63) Continuation of application No. 13/859,916, filed on Apr. 10, 2013, now Pat. No. 9,204,049.

(30) Foreign Application Priority Data

Apr. 20, 2012 (JP) ................................. 2012-096933

(51) Int. Cl.
*G02B 27/64* (2006.01)
*G02B 7/02* (2006.01)
(Continued)

(52) U.S. Cl.
CPC .......... *G02B 27/646* (2013.01); *G02B 7/023* (2013.01); *G02B 7/102* (2013.01); *G02B 13/009* (2013.01);
(Continued)

(58) Field of Classification Search
CPC .......... H04N 5/23287; H04N 5/23296; G03B 2205/0015; G03B 2205/0038;
(Continued)

(56) References Cited

U.S. PATENT DOCUMENTS 5,479,236 A 12/1995 Tanaka
5,673,149 A * 9/1997 Okada .................. G02B 27/646
359/557
(Continued)

FOREIGN PATENT DOCUMENTS

CN 101008766 A 8/2007
EP 1962496 8/2008
(Continued)

OTHER PUBLICATIONS

Search report from E.P.O., dated Jul. 22, 2013.
(Continued)

*Primary Examiner* — Paul Berardesca
(74) *Attorney, Agent, or Firm* — Greenblum & Bernstein, P.L.C.

(57) ABSTRACT

An imaging apparatus includes a front lens group, which constitutes part of an imaging optical system, at a fixed position with respect to an optical axis direction, wherein the front lens group includes a front lens element and a reflector and the reflector reflects light rays exiting from the front lens element; a movable lens group provided closer to the image plane side than the front lens group and movable along the optical axis; a support which supports the reflector; a movable frame which supports the front lens element and is supported by the support to be movable along a plane orthogonal to the optical axis of the front lens element; a front cover fixed to the support; and a driver which drives the movable frame in the plane, in accordance with vibrations applied to the photographing optical system, to reduce image shake.

9 Claims, 13 Drawing Sheets

(51) Int. Cl.
*G03B 5/02* (2006.01)
*G03B 17/17* (2006.01)
*H04N 5/225* (2006.01)
*H04N 5/232* (2006.01)
*G02B 13/00* (2006.01)
*G02B 7/10* (2006.01)
*G02B 15/177* (2006.01)

(52) U.S. Cl.
CPC ....... *G02B 13/0065* (2013.01); *G02B 15/177* (2013.01); *G03B 5/02* (2013.01); *G03B 17/17* (2013.01); *H04N 5/2254* (2013.01); *H04N 5/23287* (2013.01); *G03B 2205/0015* (2013.01)

(58) Field of Classification Search
CPC .. G03B 2205/0046; G03B 5/02; G02B 27/64; G02B 27/646; G02B 15/00–15/28; G02B 13/009
See application file for complete search history.

(56) References Cited

U.S. PATENT DOCUMENTS

| | | | |
|---|---|---|---|
| 6,829,011 B1* | 12/2004 | Higuchi | G02B 7/102 348/340 |
| 8,107,004 B2 | 1/2012 | Nomura et al. | |
| 8,837,929 B2* | 9/2014 | Nomura | G02B 27/646 348/208.11 |
| 9,025,945 B2* | 5/2015 | Nomura | G02B 15/177 396/55 |
| 9,204,049 B2* | 12/2015 | Nomura | H04N 5/23287 |
| 9,423,629 B2* | 8/2016 | Suzuka | G02B 27/646 |
| 9,606,370 B2* | 3/2017 | Suzuka | G02B 27/646 |
| 2006/0067672 A1 | 3/2006 | Washisu et al. | |
| 2006/0127073 A1 | 6/2006 | Yasuda | |
| 2006/0268431 A1 | 11/2006 | Jin | |
| 2007/0177867 A1 | 8/2007 | Yuge et al. | |
| 2008/0225139 A1* | 9/2008 | Nomura | G02B 7/102 348/240.3 |
| 2008/0266404 A1 | 10/2008 | Sato | |
| 2011/0181740 A1 | 7/2011 | Watanabe et al. | |
| 2012/0229912 A1 | 9/2012 | Abe et al. | |
| 2013/0188066 A1 | 7/2013 | Suzuka | |
| 2014/0086568 A1* | 3/2014 | Nomura | G02B 27/646 396/55 |
| 2014/0086569 A1* | 3/2014 | Nomura | G02B 27/646 396/55 |
| 2014/0218798 A1* | 8/2014 | Suzuka | G02B 27/646 359/557 |
| 2014/0218799 A1* | 8/2014 | Suzuka | G02B 27/646 359/557 |

FOREIGN PATENT DOCUMENTS

| | | |
|---|---|---|
| JP | 2006-166202 | 6/2006 |
| JP | 2006-259247 | 9/2006 |
| JP | 2006-330439 | 12/2006 |
| JP | 2007-228005 | 9/2007 |
| JP | 2008-268700 | 11/2008 |
| JP | 2009-086319 | 4/2009 |
| JP | 2010-128384 | 6/2010 |
| JP | 2010-204341 | 9/2010 |
| JP | 4717529 B2 | 4/2011 |
| JP | 4789655 B2 | 7/2011 |

OTHER PUBLICATIONS

Office Action issued in Chinese family member Patent Appl. No. 201310137073.0, dated Aug. 15, 2016, along with an English translation thereof.

\* cited by examiner

Fig.7
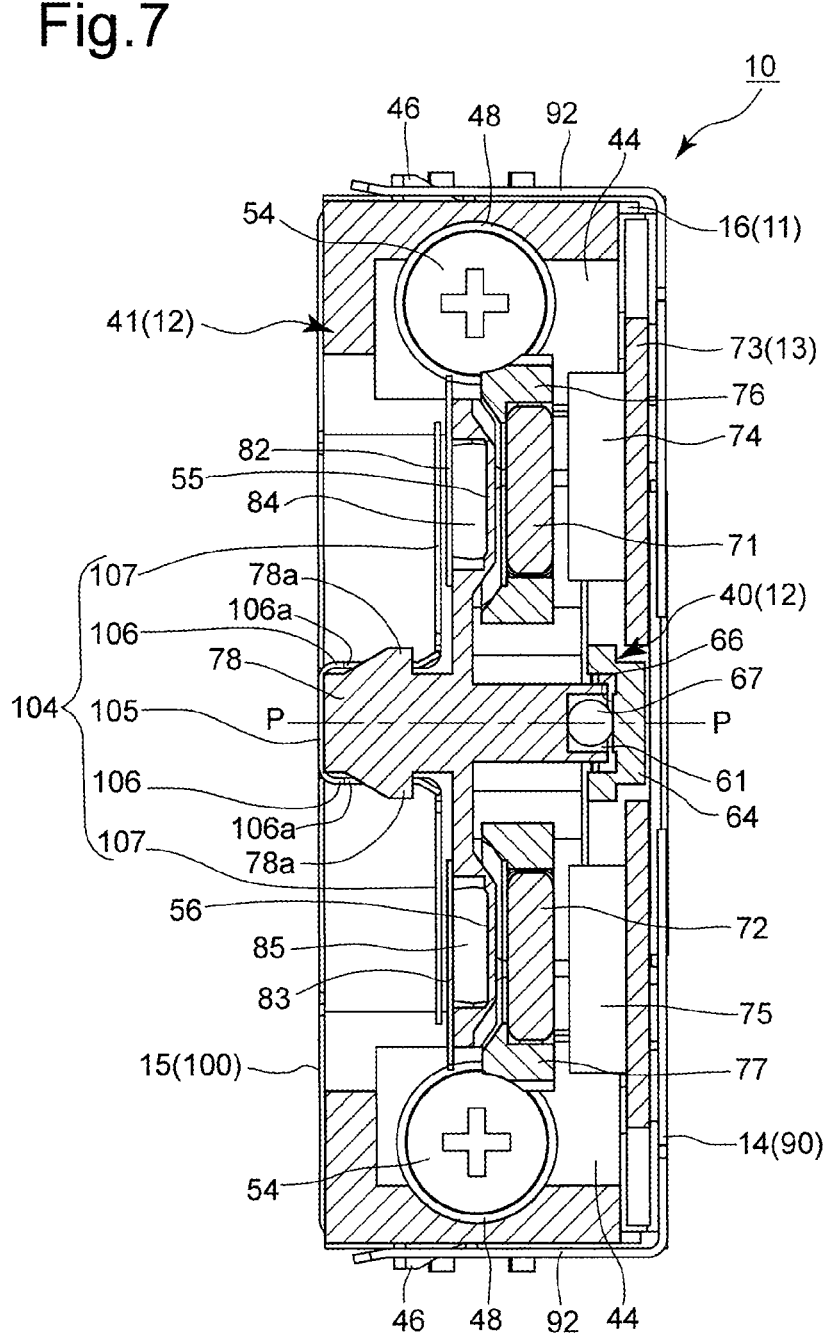
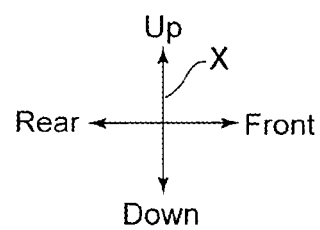

N : Negative Refractive Power
P : Positive Refractive Power

IMAGING APPARATUS

The present application is a continuation application of co-pending U.S. application Ser. No. 13/859,916, filed Apr. 10, 2013, all the contents of which are expressly incorporated by reference herein in their entirety.

BACKGROUND OF THE INVENTION

1. Field of the Invention

The present invention relates to an imaging apparatus equipped with an anti-shake (image shake correction/image stabilizing) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and personal digital assistants (PDAs) equipped with a camera, have become widespread. In these types of mobile electronic devices, it is common to provide the mobile electronic device therein with an imaging unit (imaging apparatus) which is configured so that an image sensor (image pickup device) and a photographing optical system, for guiding light emanating from a photographic object (object-emanated light) to the image sensor, are accommodated in a hollow housing of the imaging unit. Additionally, in recent years, the demand to slim down this type of imaging unit has become stronger due to further progress in the slimming down of mobile electronic devices. In order to slim down an imaging unit, it is known to provide an imaging unit with a bending optical system which reflects (bends) light rays using a reflecting surface of a reflector such as a prism or a mirror.

In addition, imaging units tend to be equipped with a so-called anti-shake (image shake correction) system that is designed to reduce image shake on an image plane that is caused by vibrations such as hand shake. The following four different types of imaging units are known in the art as imaging units using a bending optical system which are equipped with an anti-shake system: a first type (disclosed in Japanese Unexamined Patent Publication Nos. 2009-86319 and 2008-268700) in which an image sensor is moved in directions orthogonal to an image plane to reduce image shake, a second type (disclosed in Japanese Unexamined Patent Publication No. 2010-128384 and Japanese Patent No. 4,789,655) in which a lens disposed behind a reflector (on the image plane side) that has a reflecting surface is moved in directions orthogonal to an optical axis to reduce image shake, a third type (disclosed in Japanese Unexamined Patent Publication Nos. 2007-228005, 2010-204341, 2006-330439, and Japanese Patent No. 4,717,529) in which the angle of a reflector (a reflecting surface thereof) or the angle of a lens adjacent to a reflector is changed to reduce image shake, and a fourth type (disclosed in Japanese Unexamined Patent Publication Nos. 2006-166202 and 2006-259247) in which an entire imaging unit is obliquely moved to reduce image shake.

The first type of anti-shake system tends to become complicated in structure and tends to increase in cost because a circuit board connected to the image sensor is moved so as to follow movements of the image sensor, which requires electrical components around the image sensor also to be movable components in addition to the image sensor. In addition, the periphery of the imaging surface of the image sensor is required to be dust tight; however, in small imaging units intended for being incorporated into a mobile phone or a personal digital assistant, it is difficult to secure sufficient space for allowing the image sensor to perform an anti-shake (image shake correction/image-stabilizing) operation while maintaining the dust-tight structure of the image sensor.

The second type of anti-shake system has a structure such that the moving direction of the lens group, disposed behind the reflector, during an anti-shake operation corresponds to the direction of the thickness of the imaging unit (i.e., the forward/rearward direction of the imaging unit, wherein the direction toward an object to be photographed refers to the forward (front) direction of the imaging unit), and hence, there is a problem with providing enough space to house such an anti-shake structure in a slimmed-down imaging unit. In other words, the slimming of the imaging unit is limited if this type of anti-shake system is used. There is a similar problem also in the type of anti-shake system in which an image sensor is moved, instead of a lens group, in the direction of the thickness of the imaging unit.

The third type of anti-shake system requires a large space for allowing the reflector or the lens group to move in oblique directions, and accordingly, the imaging unit easily enlarged in size. The fourth type of anti-shake system requires a larger space for allowing the entire imaging unit to be obliquely moved to reduce image shake.

SUMMARY OF THE INVENTION

The present invention has been devised in view of the above mentioned drawbacks and provides an imaging apparatus which can carry out image-shake correction (image stabilization) while achieving miniaturization of the imaging apparatus, especially reduction in thickness thereof.

According to an aspect of the present invention, an imaging apparatus is provided, including a front lens group, which constitutes part of an imaging optical system of the imaging apparatus, provided at a fixed position with respect to an optical axis direction, wherein the front lens group includes at least one front lens element, and a reflector, in that order from an object side, wherein the reflector reflects light rays exiting from the front lens element; a movable lens group, which constitutes another part of the imaging optical system, provided closer to the image plane side than the front lens group and movable along the optical axis; a support member which supports at least the reflector of the front lens group; a movable frame which supports the front lens element of the front lens group and is supported by the support member to be movable along a plane orthogonal to the optical axis of the front lens element; and a driver which drives the movable frame in the plane, in accordance with vibrations applied to the photographing optical system, to reduce image shake on the image plane.

It is desirable for the front lens group to include at least one rear lens element onto which the light rays reflected by the reflector are incident.

Although the front lens element of the front lens group can have an arbitrary refractive power, it is desirable for the front lens element of the front lens group to have a negative refractive power.

It is desirable for the photographing optical system to include a zoom lens system which varies a focal length thereof by moving the movable lens group in the optical axis direction.

It is desirable for the front lens group to have a negative refractive power and for the movable lens group to include a second lens group having a positive refractive power and a third lens group having a positive refractive power, in that order from the object side.

It is desirable for the reflector of the front lens group to include a prism.

It is desirable for the following condition (1) to be satisfied:

$$1<D/S1<10 \qquad (1),$$

wherein D designates the distance between the front lens element and the reflector in the optical axis direction, and S1 designates an amount of movement of the front lens element when a shake correction angle is 0.5 degrees.

Satisfying condition (1) makes it possible to achieve miniaturization of the imaging apparatus while providing a moderate (suitable) clearance between the front lens element and the reflector which prevents the front lens element and the reflector from interfering with each other.

It is desirable for the support member to include a frame body having a box shape which supports the movable lens group in a manner to allow the movable lens group to move in the optical axis direction; and a support frame which fixedly supports the reflector, is fixed to the frame body, and supports the movable frame in a manner to allow the movable frame to move in the plane orthogonal to the optical axis of the front lens element.

It is desirable for the imaging apparatus to include a second reflector which is provided between the movable lens group and the image plane and reflects light rays, exiting from the movable lens group, toward the image plane.

It is desirable for the imaging apparatus to include an image sensor which lies on the image plane.

It is desirable for the following condition (2) to be satisfied:

$$|S/Y|<0.2, \qquad (2)$$

wherein S designates a maximum amount of movement of the front lens element along a plane orthogonal to the optical axis, and Y designates a diagonal image height of an effective light receiving area of the image sensor.

Satisfying condition (2) makes the optical performance of the imaging apparatus difficult to deteriorate and also makes it possible to prevent the imaging apparatus from enlarging in size.

According to the present invention, an anti-shake operation is performed by moving the front lens element, which is located in front of the reflector of the front lens group, in directions orthogonal to an optical axis, and accordingly, miniaturization of the imaging apparatus, especially slimming down thereof in the forward/rearward direction can be efficiently achieved even though the imaging apparatus incorporates an anti-shake system.

The present disclosure relates to subject matter contained in Japanese Patent Application No. 2012-96933 (filed on Apr. 20, 2012) which is expressly incorporated herein by reference in its entirety.

BRIEF DESCRIPTION OF THE DRAWINGS

The present invention will be described below in detail with reference to the accompanying drawings in which:

FIG. 7 is a longitudinal sectional view taken along the line VII-VII shown in FIG. 4;

DESCRIPTION OF THE PREFERRED EMBODIMENTS

Figure 1:
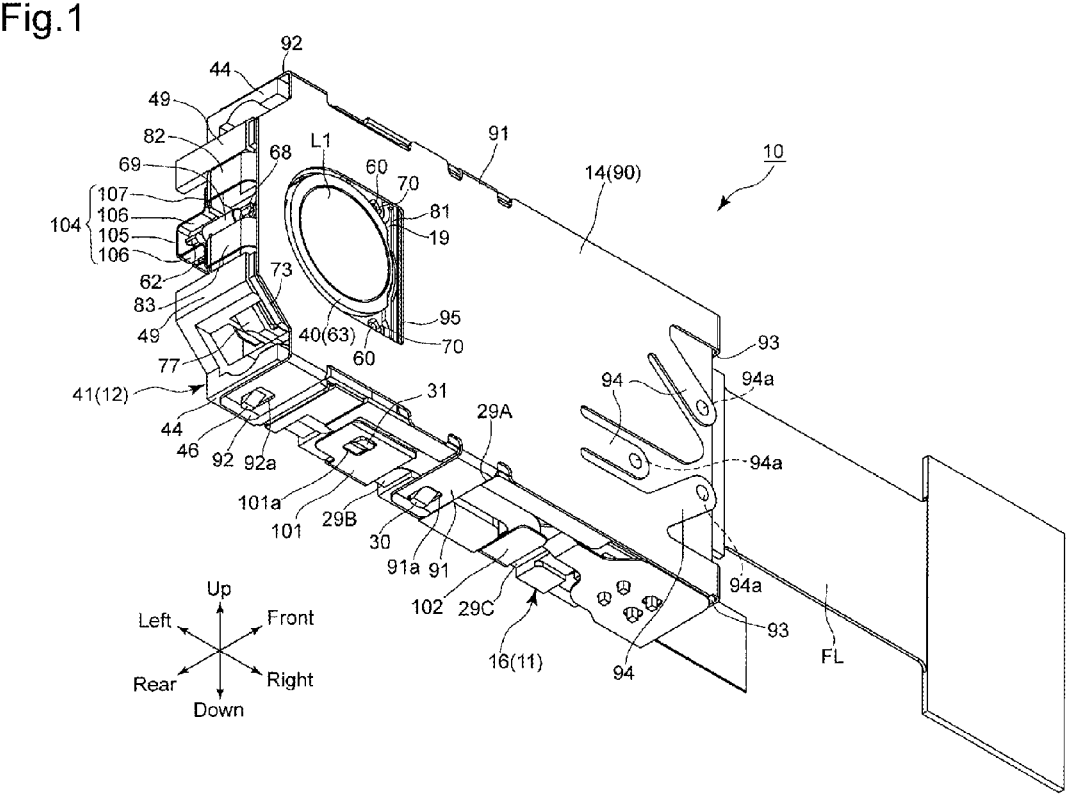
FIG. 1 is a perspective view of an embodiment of an imaging unit according to the present invention.

An embodiment of an imaging unit (imaging apparatus) 10 according to the present invention will be discussed below with reference to FIGS. 1 through 8. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIGS. 1 and 4, the imaging unit 10 has a laterally elongated shape which is slim in the forward/rearward direction and long in the leftward/rightward direction.

Figure 6:
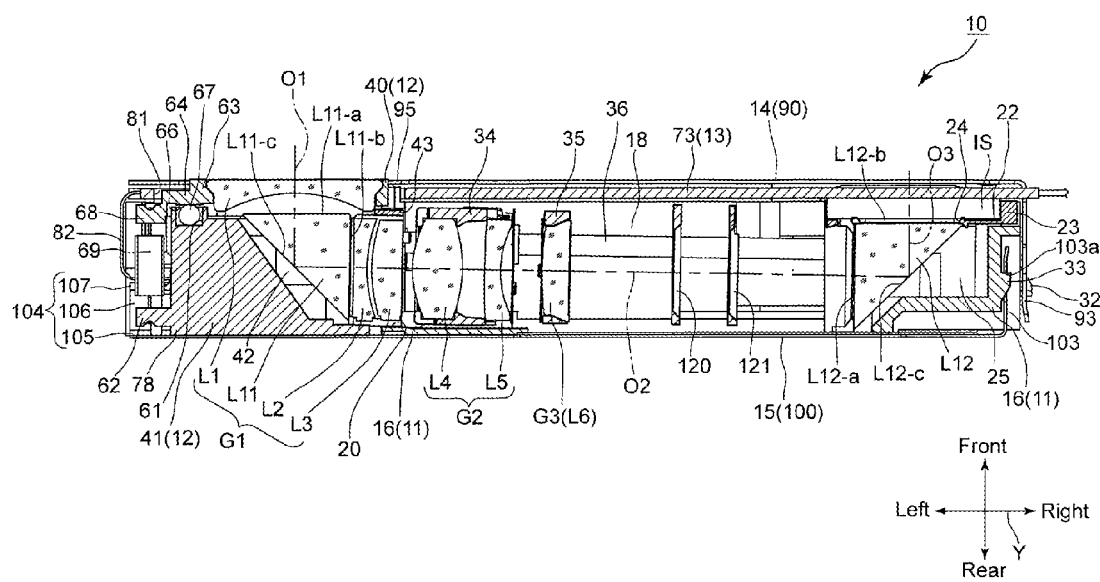
FIG. 6 is a transverse sectional view taken along the line VI-VI shown in FIG. 4.
Figure 8:
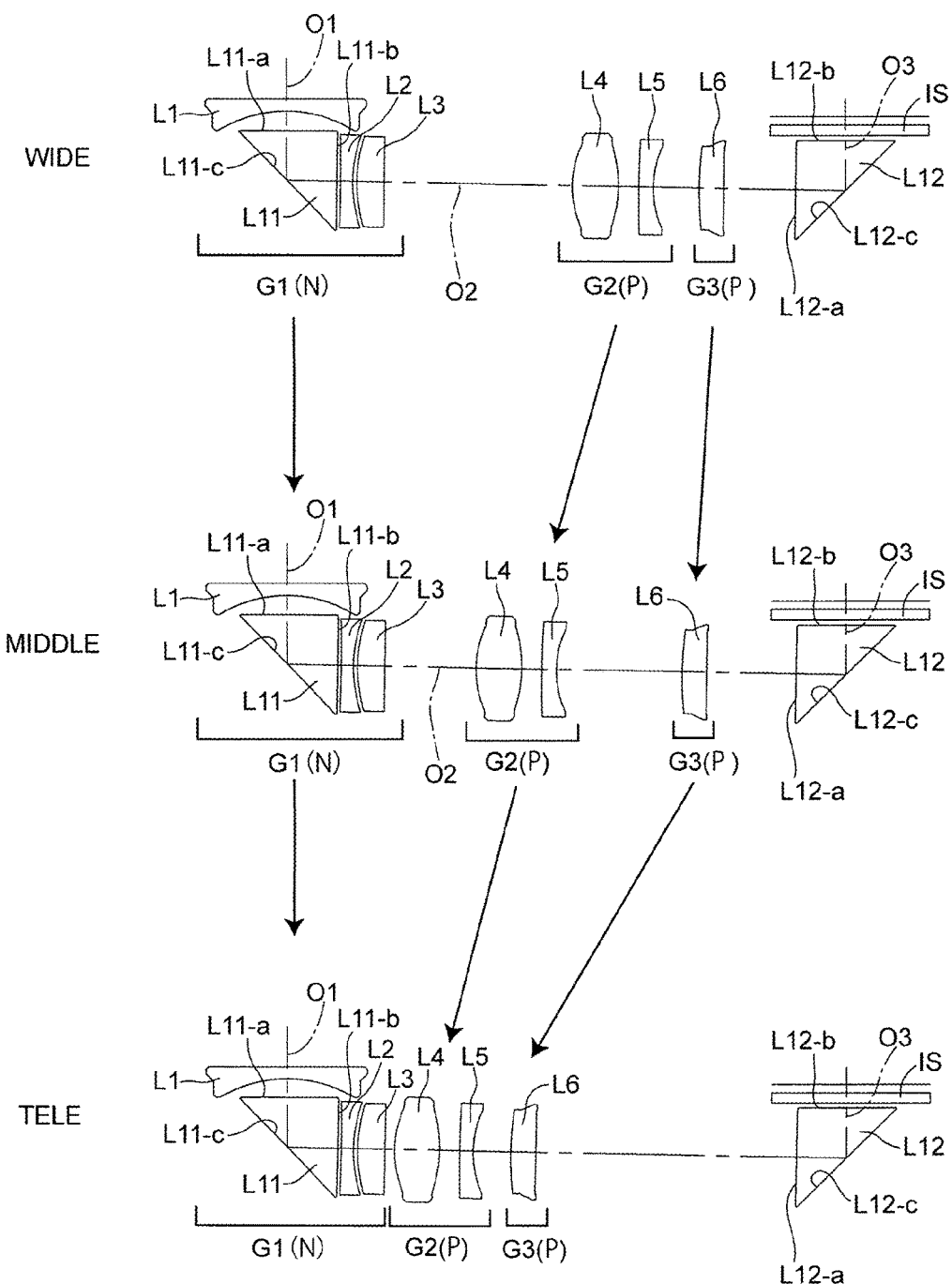
FIG. 8 shows sectional side elevational views of an imaging optical system provided in the imaging unit, schematically showing different states of the imaging optical system at the wide-angle extremity, an intermediate focal length and the telephoto extremity.

As shown in FIGS. 6 and 8, the imaging unit 10 is provided with a first lens group (front lens group) G1, a second lens group (movable lens group) G2 and a third lens group (movable lens group) G3. The first lens group G1 is provided with a first prism (reflector) L11 and the imaging unit 10 is provided with a second prism (second reflector) L12 on the right-hand side of the third lens group G3, and the imaging unit 10 is configured as a bending optical system which reflects (bends) light rays at substantially right angles at each of the first prism L11 and the second prism L12. The first lens group G1 is configured of a first lens element (front lens element) L1, the first prism L11, a second lens element (rear lens element) L2 and a third lens element (rear lens element) L3. The first lens element L1 is positioned in front of (on the object side of) an incident surface L11-*a* of the first prism L11, while the second lens element L2 and the third lens element L3 are positioned on the right-hand side (image plane side) of an exit surface L11-*c* of the first prism L11. The first lens element L1 is a negative lens element (planoconcave lens element), the exit surface of which that faces the first prism L11 is formed as a concave surface, the second lens element L2 is a negative lens element (biconcave lens element), the incident and exit surfaces of which are each formed as a concave surface, the third lens element L3 is a positive lens element (meniscus lens element), the incident surface of which is formed as a convex surface, and the first lens group G1 has a negative refractive power overall. The second lens group G2 is configured of a fourth lens element L4 and a fifth lens element L5. The fourth lens element L4 is a positive lens element (biconvex lens element), the incident and exit surfaces of which are each formed as a convex surface, and the fifth lens element L5 is a negative lens element (meniscus lens element), the incident and exit surfaces of which are formed as a convex surface and a concave surface, respectively, and the second lens group G2 has a positive refractive power overall. The third lens group G3 is configured of a sixth lens element L6 that is a positive lens element (planoconvex lens element), the exit surface of which is formed as a convex surface. The third lens group G3 has a positive refractive power.

Light rays which emanate from the photographic object to be incident on the first lens element L1 along a first optical axis O1 extending in the rearward direction are reflected by a reflecting surface L11-*c* of the first prism L11 in a direction along a second optical axis O2 (extending in the rightward direction) to pass through each of the second through sixth lens elements L2, L3, L4, L5 and L6 that lie on the second optical axis O2. Subsequently, the light rays exiting from the sixth lens element L6 are reflected by a reflecting surface L12-*c* of the second prism L12 in a direction along a third optical axis O3 (extending in the forward direction) to be formed on the imaging surface of an image sensor IS. The first optical axis O1 and the third optical axis O3 are substantially parallel to each other and lie, together with the second optical axis O2, on a common plane (an imaginary plane P shown in FIGS. 4, 5 and 7). The imaging optical system of the imaging unit 10 is a zoom lens system, and a zooming operation (power-varying operation) is performed by moving the second lens group G2 and the third lens group G3 along the second optical axis O2. In addition, a focusing operation is performed by moving the third lens group G3 along the second optical axis O2. Accordingly, the imaging optical system of the imaging unit 10 is a zoom lens system configured of three lens groups having negative power, positive power and positive power, respectively, in that order from the object side; additionally, the position of the first lens group G1 in the optical axis direction is fixed during zooming, while the second lens group G2 and the third lens group G3 are movable lens groups which move along the second optical axis O2 during zooming.

Figure 2:
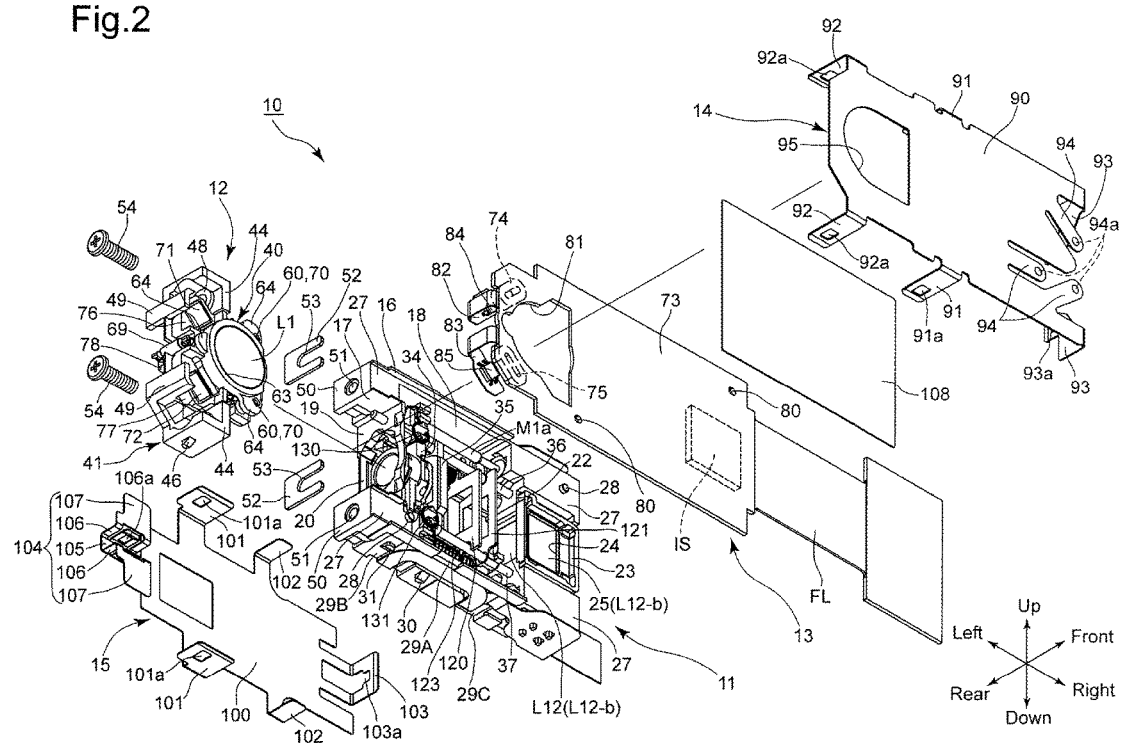
FIG. 2 is an exploded perspective view of the imaging unit.

As shown in FIGS. 1 and 2, the imaging unit 10 is provided with a body module 11, a first lens-group unit 12, a board module 13, a front cover 14 and a rear cover 15.

The body module 11 is provided with a housing (support member/frame body) 16 made of synthetic resin, and the second lens group G2, the third lens group G3 and the second prism L12 that constitute elements of the imaging optical system are held by the housing 16 therein. The housing 16 is a box-shaped member which is elongated in the leftward/rightward direction and small in thickness (slim) in the forward/rearward direction. The housing 16 is provided at the left end thereof with a mounting recess 17. The housing 16 is provided, on the front side thereof in a section positioned on the right side of the mounting recess 17, with an accommodating recess (internal space) 18 that is substantially rectangular in cross sectional shape. The housing 16 is provided between the mounting recess 17 and the accommodating recess 18 with a partition wall 19. The housing 16 is provided at a center of the partition wall 19 with a communication hole (through-hole) 20, via which the mounting recess 17 and the accommodating recess 18 are communicatively connected with each other. The housing 16 is provided, on the right side of the accommodating recess 18, with a positioning recess 22 having a substantially rectangular shape, in a front view. The positioning recess 22 is positioned at a forward position with respect to the base surface of the accommodating recess 18 (see FIG. 6). A packing 23 made of an elastically deformable material is positioned in the positioning recess 22 and supported thereby. The packing 23 is in the shape of a rectangular frame which is fitted into the positioning recess 22. The packing 23 is provided at the bottom (in the base) thereof with a through-hole 24. The housing 16 is provided in the positioning recess 22 with a prism mounting recess 25 which is open at the front and left sides. The housing 16 is provided, around the front edge of the inner peripheral surface of the accommodating recess 18, with a board support surface 27 which is positioned at a rearward position with respect to the frontmost end of the housing 16 and lies in a plane orthogonal to the forward/rearward direction. The housing 16 is further provided, on the board support surface 27 at two different positions thereon, with two lock projections 28, respectively, which project forward from the board support surface 27. The housing 16 is provided on each of the upper and lower sides thereof with three engaging recesses 29A, 29B and 29C and two engaging projections 30 and 31. The housing 16 is further provided on the right side thereof with an upper and lower pair of engaging projections 32 (see FIG. 5) and an engaging projection 33 (see FIG. 6).

The second prism L12 is fit-engaged into the prism mounting recess 25 and fixed thereto. The second prism L12 is provided with an incident surface L12-*a*, an exit surface L12-*b* and the reflecting surface L12-*c*. The incident surface L12-*a* is positioned on the second optical axis O2 and faces leftward, the exit surface L12-*b* is positioned on the third optical axis O3 and faces forward, and the reflecting surface L12-*a* is angled at substantially 45 degrees with respect to the incident surface L12-*a* and the exit surface L12-*b*. With the second prism L12 fixed to the prism mounting recess 25, the exit surface L12-*b* is forwardly exposed through the through-hole 24 of the packing 23.

The second lens group G2 and the third lens group G3 are supported to be positioned on the second optical axis O2 on the left-hand side of the incident surface L12-*a* of the second prism L12. The body module 11 is provided with a first rod 36 and a second rod 37, each of which is made of metal and extends linearly in the leftward/rightward direction. The first rod 36 and the second rod 37 are each fixed at both ends thereof to an inner surface of the right side wall of the housing 16 and the partition wall 19 so that the first rod 36 and the second rod 37 are aligned in the upward/downward direction. A through-hole formed on an upper part of a second lens group frame 34, made of synthetic resin, is fitted onto the first rod 36, while a rotation stop groove formed in a lower end of the second lens group frame 34 is engaged with the second rod 37. Since this engagement of the aforementioned rotation stop groove with the second rod 37 prevents the second lens group frame 34 from rotating about the first rod 36, the second lens group frame 34 is slidable in the leftward/rightward along the first rod 36 and the second rod 37. The fourth lens element L4 and the fifth lens element L5, which constitute the second lens group G2, are fit-engaged into and fixed to a lens holding hole formed through the second lens group frame 34 in the leftward/rightward direction. Additionally, a nut holding portion 34a (see FIG. 5) is formed at the upper end of the second lens group frame 34, and a driven nut 38 (see FIG. 5) having a female screw hole, the axis of which extends in the leftward/rightward direction, is engaged with the nut holding portion 34a so as not to rotate (a portion of the nut holding portion 34a constitutes a rotation stop for the driven nut 38). The nut holding portion 34a and the driven nut 38 are resiliently connected to each other by a torsion spring 130. The body module 11 is provided with a first motor M1 (see FIG. 5) which is fixed to the housing 16 in an upper part of the prism mounting recess 25. The first motor M1 is a stepping motor. The first motor M1 is provided with a rotary drive shaft M1a which extends linearly leftwards, and a male thread formed on the rotary drive shaft M1a is screw-engaged with the female screw hole of the driven nut 38. Accordingly, forward and reverse rotations of the rotary drive shaft M1a of the first motor M1 cause the second lens group frame 34 (the second lens group G2) to move linearly in the leftward/rightward direction along the first rod 36 and the second rod 37.

A through-hole formed through a lower part of a third lens group frame 35 made of synthetic resin and positioned on the right-hand side of the second lens group frame 34 is fitted onto the second rod 37, while a rotation stop groove formed on an upper end of the third lens group frame 35 is engaged with the first rod 36, and accordingly, the third lens group frame 35 is slidable in the leftward/rightward direction along the first rod 36 and the second rod 37 (while being prevented from rotating about the second rod 37). The sixth lens element L6, which constitutes an element of the third lens group G3, is fit-engaged into and fixed to a lens holding hole formed through the third lens group frame 35 in the leftward/rightward direction, a nut holding portion 35a (see FIG. 5) is formed at the lower end of the third lens group frame 35, and a driven nut 39 (see FIG. 5) having a female screw hole, the axis of which extends in the leftward/rightward direction, is engaged with the nut holding portion 35a so as not to rotate (a portion of the nut holding portion 35a constitutes a rotation stop for the driven nut 39). The nut holding portion 35a and the driven nut 39 are resiliently connected to each other by a torsion spring 131. The body module 11 is provided with a second motor M2 (see FIG. 5) which is fixed to the housing 16 in a lower part of the prism mounting recess 25. The second motor M2 is a stepping motor which is identical in specifications to the first motor M1. The second motor M2 is provided with a rotary drive shaft M2a (identical in specifications to the rotary drive shaft Mia) which extends linearly leftwards, and a male thread formed on the rotary drive shaft M2a is screw-engaged with the female screw hole of the driven nut 39. Accordingly, forward and reverse rotations of the rotary drive shaft M2a of the second motor M2 cause the third lens group frame 39 (the third lens group G3) to move linearly in the leftward/rightward direction along the first rod 36 and the second rod 37.

The body module 11 is provided with a light shield frame 120 and a light shield frame 121 which are slidably supported by the first rod 36 and the second rod 37, respectively. The light shield frames 120 and 121 are positioned between the third lens group frame 35 (the third lens group G3) and the prism mounting recess 25 (the second prism L12), the body module 11 is provided between the light shield frame 120 and the second lens group frame 34 with a compression coil spring 122 which enables the light shield frame 120 to be held at a proper position in the slidable direction thereof, and the body module 11 is provided between the light shield frame 121 and the third lens group frame 35 with a compression coil spring 123 which enables the light shield frame 121 to be held at a proper position in the slidable direction thereof. Each of the light shield frames 120 and 121 is provided at a center thereof with a rectangular aperture, which extends therethrough in the leftward/rightward direction, and is further provided with a frame portion which surrounds the rectangular aperture. The rectangular apertures of the light shield frames 120 and 121 allow the light rays traveling from the third lens group G3 (the sixth lens element L6) to the second prism L12 to pass through the light shield frames 120 and 121, while the frame portions of the light shield frames 120 and 121 shield unwanted light.

Figure 3:
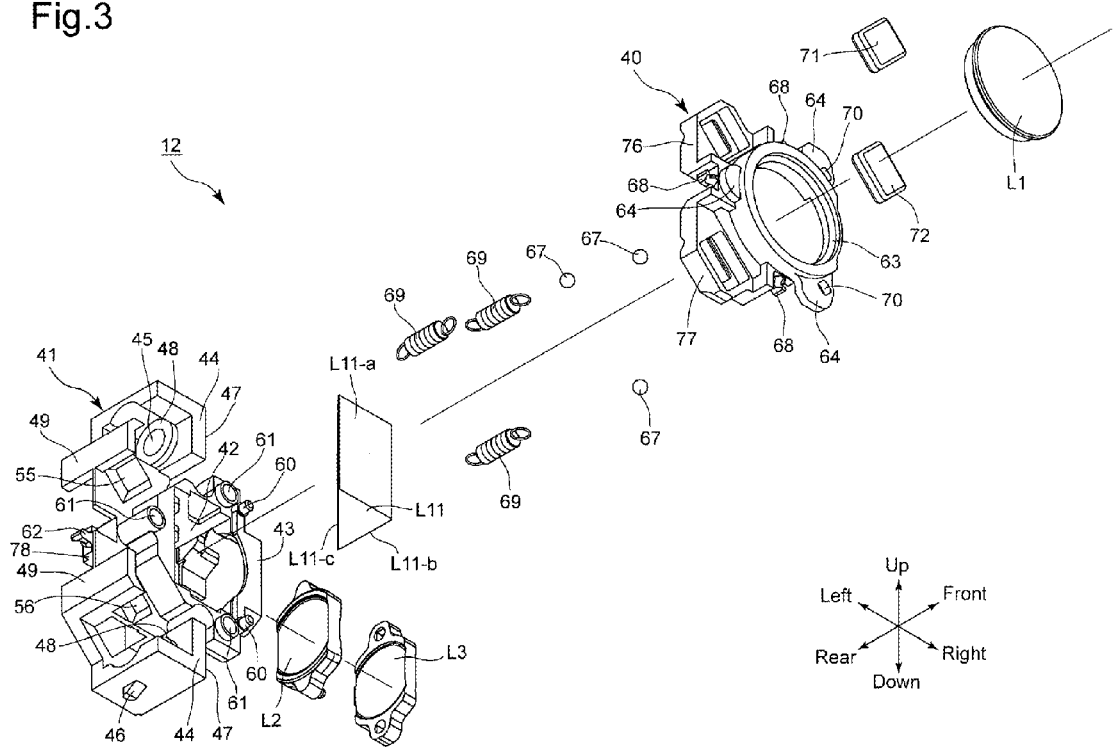
FIG. 3 is an exploded perspective view of a first lens-group unit of the imaging unit.

As shown in FIG. 3, the first lens-group unit 12 is provided with a first lens frame (movable frame) 40 which holds the first lens element L1 and a base frame (support member/support frame) 41 which holds the first prism L11, the second lens element L2 and the third lens element L3. As shown in FIG. 6, the base frame 41 is provided with a prism mounting recess 42 which is open at the front and left sides, and the first prism L11 is fit-engaged into the prism mounting recess 42 and fixed thereto. The first prism L11 is provided with the incident surface L11-a, the exit surface L11-b and the reflecting surface L11-c as described above. The incident surface L11-a is positioned on the first optical axis O1 and faces forward, the exit surface L11-b is positioned on the second optical axis O2 and faces rightward, and the reflecting surface L11-c is positioned at a substantially 45 degree angle with respect to the incident surface L11-a and the exit surface L11-b. The base frame 41 is further provided with a lens holding portion 43 which extends through the base frame 41 in the rightward direction from the prism mounting recess 42, and the second lens element L2 and the third lens element L3 are fit-engaged into the lens holding portion 43.

Figure 5:
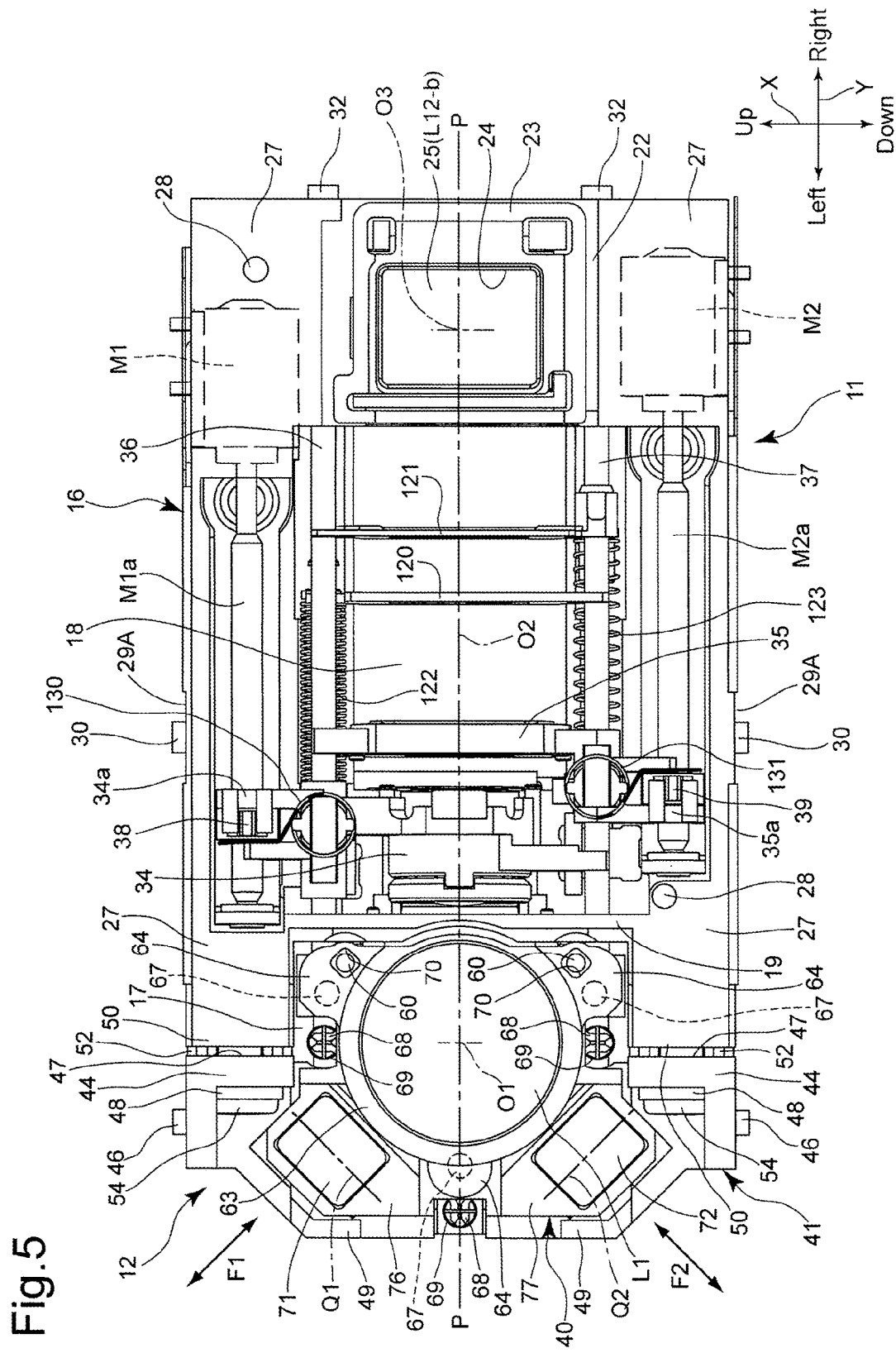
FIG. 5 is a front elevational view of the imaging unit from which a front cover and a board module are removed.

The base frame 41 is provided with a pair of flanges 44 which project upward and downward, respectively. Each flange 44 is in the shape of a letter L (or an inverted L) in a front view as shown in FIG. 5. A screw insertion hole 45 (see FIG. 3) extends in the leftward/rightward direction through a wall (vertical wall) of each flange 44 which extends in the upward/downward direction. An engaging projection 46 is provided on, and projects from, an outer surface of a wall (horizontal wall) of each flange 44 on a part thereof that extends in the leftward/rightward direction. In each flange 44, the right side of the vertical wall of the flange 44, through which the screw insertion hole 45 is open, is formed as a flat spacer holding surface 47, and a screw seat 48 which surrounds the screw insertion hole 45 is formed on the left side of the vertical wall of the flange 44, which is on the opposite side of the flange 44 from the spacer holding surface 47. The base frame 41 is provided, on the left end thereof, with an upper and lower pair of outer walls 49. In addition, the base frame 41 is provided in the vicinity of the upper and lower pair of outer walls 49 with an upper and lower pair of anti-shake sensor support portions 55 and 56, respectively (see FIGS. 3 and 7). Each of the anti-shake sensor support portions 55 and 56 is in the shape of a substantially rectangular recess which faces toward the rear of the base frame 41 (leftward with respect to FIG. 7).

As shown in FIG. 5, a portion of the base frame 41 from the pair of flanges 44 rightward has a shape that enables the portion of the base frame 41 to be fitted into the mounting recess 17. The left ends of the first rod 36 and the second rod 37 project leftward from the partition wall 19 of the housing 16 (a state where the left end of the first rod 36 projects leftward from the partition wall 19 is shown in FIG. 2). When the base frame 41 is fit-engaged into the mounting recess 17, the left ends of the first rod 36 and the second rod 37 that project from the partition wall 19 are inserted into positioning holes (not shown) formed in the base frame 41 to thereby fix the positions of the base frame 41 in the forward/rearward direction and the upward/downward direction. In addition, the lens holding portion 43 of the base frame 41 is fitted into the communication hole 20 of the partition wall 19 of the housing 16, and the exit surface of the third lens element L3 that constitutes an element of the first lens group G1 faces the incident surface of the fourth lens element L4 that constitutes an element of the second lens group G2.

A pair of flange support seats 50 are formed on the housing 16 at positions immediately above and below the mounting recess 17, respectively, and a screw hole 51 is formed in each flange support seat 50 so that the axis of the screw hole 51 extends in the leftward/rightward direction. The pair of flange support seats 50 face the spacer holding surfaces 47 of the pair of flanges 44 of the base frame 41, and the position of the base frame 41 relative to the housing 16 in the leftward/rightward direction is determined by the distance between the spacer holding surfaces 47 of the pair of flanges 44 and the pair of flange support seats 50. A pair of spacers 52 for adjustment of the aforementioned distance are installed and held between the pair of flanges 44 (the spacer holding surfaces 47) and the pair of flange support seats 50, respectively. Each spacer 52 is in the shape of a rectangular plate and is provided with a screw insertion groove 53 which is formed (recessed) toward the center of the spacer 52 from one side thereof. Various types of spacers 52 having different thicknesses are prepared in advance, and a pair of spacers 52 having an appropriate thickness are selected from these spacers 52 and inserted in between the spacer holding surfaces 47 of the pair of flanges 44 and the pair of flange support seats 50. Thereafter, the screw shafts of two set screws 54 are screwed into the screw holes 51 of the pair of flange support seats 50 through the screw insertion holes 45 of the pair of flanges 44 and the screw insertion grooves 53 of the pair of spacers 52, respectively, and the set screws 54 are tightened until the heads of the two set screws 54 comes into contact with the two screw seats 48, respectively. This secures the base frame 41 to the housing 16. The relative position between the first lens group G1 and the second lens group G2 in a direction along the second optical axis O2 can be changed by changing the thickness of each spacer 52 (by replacing each spacer 52 by another spacer 52 having a different thickness). More specifically, the distance between the third lens element L3 and the fourth lens element L4 is changed. The effect of flange back adjustment on the entire imaging optical system is obtained by a change in the position of the first lens group G1, which has a predetermined refractive power, in the optical axis direction.

The imaging unit 10 is provided with an anti-shake (image shake correction/image-stabilizing) system that reduces image shake on an image plane which is caused by vibrations such as hand shake. This anti-shake system drives the first lens element L1 of the first lens group G1 in a plane orthogonal to the first optical axis O1, more specifically, the anti-shake system drives the first lens frame 40 relative to the base frame 41 in this orthogonal plane. The base frame 41 is provided around the prism mounting recess 42 with two movement limit projections (movement limiter) 60 which project forwardly and three ball support holes 61, which are bottomed holes that are open toward the front. The three ball support holes 61 are arranged at substantially equi-intervals in a circumferential direction about the first optical axis O1. The base frame 41 is further provided with three spring hook projections 62.

The first lens frame 40 is provided with a cylindrical lens holding portion 63 and provided, at different positions around the lens holding portion 63 with three flanges 64, respectively, which project radially outwards. Three ball contact surfaces 66 (see FIGS. 6 and 7) are formed on the rear surfaces of the flanges 64, respectively, and three guide balls (anti-shake guide members) 67 are held between the ball contact surfaces 66 and the bottom surfaces of the ball support holes 61, respectively. The ball contact surfaces 66 are flat surfaces substantially orthogonal to the first optical axis O1. The guide balls 67 are loosely fitted into the ball support holes 61, respectively. When positioned in the vicinity of the center of the associated support hole 61, each guide ball 67 does not come in contact with the inner wall of the associated ball support hole 61.

The first lens frame 40 is provided, at different circumferential positions on the outer periphery thereof, with three spring hook projections 68, respectively, and three extension springs 69 are extended and installed between the spring hook projections 68 and the spring hook projections 62 that are formed on the base 41, respectively. The first lens frame 40 is biased in a direction to approach the base frame 41 (i.e., is biased rearward) by the biasing force of the extension springs 69 to make the ball contact surfaces 66 press against the guide balls 67, respectively, to thereby prevent the first lens frame 40 from moving rearward. In this state, the ball contact surfaces 66 are in point contact with the guide balls 67, respectively, and the first lens frame 40 can move in directions orthogonal to the first optical axis O1 by making the ball contact surfaces 66 slidingly contact the guide balls 67 (or while making the guide balls 67 roll when the guide balls 67 are not in contact with the inner walls of the ball support holes 61, respectively). The prism mounting recess 42, the flanges 44 and the outer walls 49 of the base frame 41 are formed to have shapes so as not to interfere with the movement of the first lens frame 40.

Figure 4:
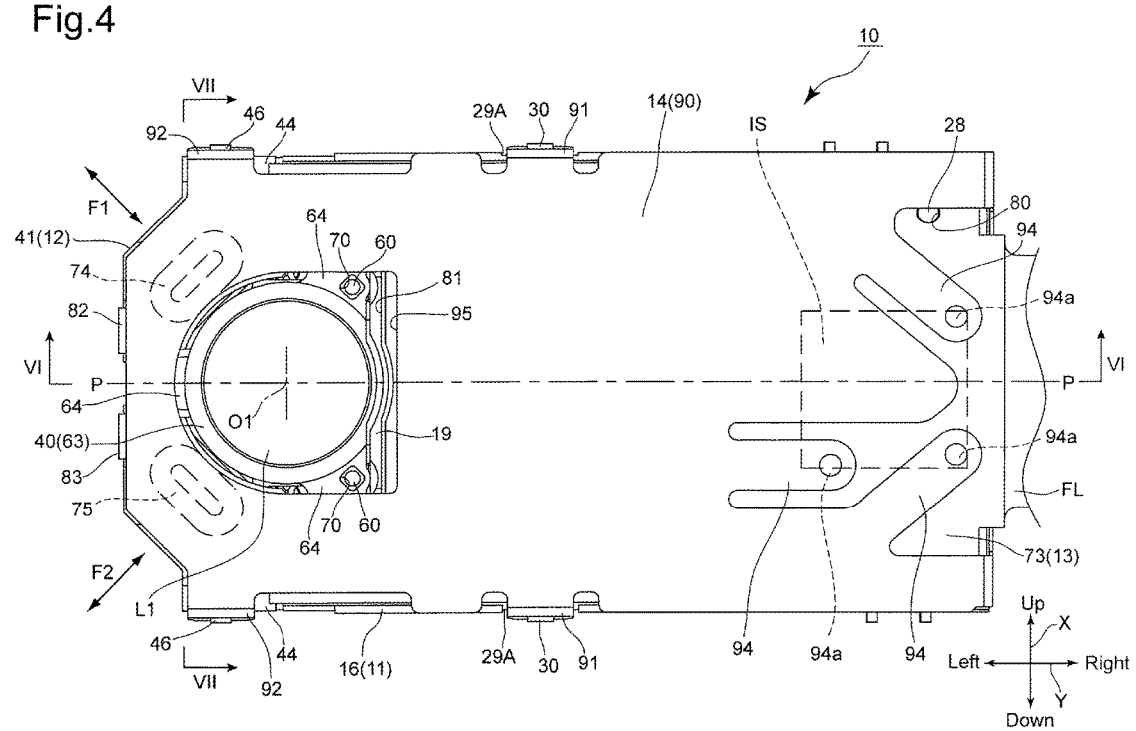
FIG. 4 is a front elevational view of the imaging unit.

The first lens frame 40 is further provided with two movement limit holes 70 into which the movement limit projections 60 of the base frame 41 are inserted, respectively. As shown in FIGS. 4 and 5, the inner wall of each movement limit hole 70 is rectangular, generally square in shape in a plane substantially orthogonal to the first optical axis O1. In the following descriptions, the direction of one of the two diagonal lines across the inner wall of each movement limit hole 70 in a plane orthogonal to the first optical axis O1 refers to the X-axis direction and the direction of the other diagonal line refers to the Y-axis direction. The X-axis direction generally coincides with the upward/downward direction of the imaging unit 10, and the Y-axis direction generally coincides with the leftward/rightward direction of the imaging unit 10. The first lens frame 40 can move relative to the base frame 41 in a plane orthogonal to the first optical axis O1 within a range until the movement limit projections 60 come into contact with the inner walls of the movement limit holes 70, respectively.

The first lens frame 40 is driven by an electromagnetic actuator. This electromagnetic actuator is provided with two permanent magnets (elements of a driver) 71 and 72 which are supported by the first lens frame 40 and two coils (elements of the driver) 74 and 75 which are supported by a circuit board 73 of the board module 13. The permanent magnets 71 and 72 are fixed to magnet holding portions 76 and 77, respectively, which are provided on the first lens frame 40. The rear surfaces of the magnet holding portions 76 and 77 are shaped to superpose the front surfaces of the anti-shake sensor support portions 55 and 56 of the base frame 41, respectively, with the first lens frame 40 and the base frame 41 combined (see FIG. 7). The permanent magnets 71 and 72 are substantially identical in shape and size to each other. Each of the permanent magnets 71 and 72 is in the shape of a narrow, thin rectangular plate. The permanent magnets 71 and 72 are arranged symmetrically with respect to the imaginary plane P (see FIGS. 4, 5 and 7) in which the first optical axis O1, the second optical axis O2 and the third optical axis O3 lie. More specifically, opposite sides of a magnetic pole boundary line Q1 (see FIG. 5) of the permanent magnet 71, which extends in the lengthwise direction thereof and passes through an approximate center of the permanent magnet 71 with respect to the width thereof, are magnetized into north and south poles, respectively, while opposite sides of a magnetic pole boundary line Q2 (see FIG. 5) of the permanent magnet 72, which extends in the lengthwise direction thereof and passes through an approximate center of the permanent magnet 72 with respect to the width thereof, are magnetized into north and south poles, respectively. In other words, the magnetic pole boundary line Q1 defines a boundary between north and south poles of the permanent magnet 71, while the magnetic pole boundary line Q2 defines a boundary between north and south poles of the permanent magnet 72. The magnetic pole boundary line Q1 of the permanent magnet 71 and the magnetic pole boundary line Q2 of the permanent magnet 72 are inclined to each other so that the distance therebetween (i.e., the distance from the imaginary plane P) gradually increases in a direction from left to right. The inclination angles of the magnetic pole boundaries line Q1 and Q2 of the permanent magnets 71 and 72 with respect to the imaginary plane P are set to approximately ±45 degrees, respectively. Namely, the lengthwise directions (the magnetic pole boundary lines Q1 and Q2) of the permanent magnets 71 and 72 are substantially orthogonal to each other. Since the set screws 54 which fix the base frame 41 to the housing 16 are positioned in the vicinity of the permanent magnets 71 and 72, each set screw 54 is made of a nonmetal such as resin or a nonmagnetic (magnetically non-attracted) metal so that no influence is exerted on the anti-shake driving operation of the electromagnetic actuator.

The board module 13 is provided with a circuit board 73 made of a flat plate, the front shape thereof corresponding to the front shape of a combination of the accommodating recess 18 of the housing 16 and the first lens-group unit 12. The circuit board 73 lies in a plane orthogonal to the forward/rearward direction. A printed circuit is formed on the rear surface of the circuit board 73 and connected to a flexible wiring board FL which extends rightward from the circuit board 73. The image sensor IS is fixed to the rear of the circuit board 73 at a position in the vicinity of the right end thereof, and a plurality of terminals (not shown) provided on the image sensor IS are fixedly connected to the printed circuit by soldering. The surface of the image sensor IS which faces rearwardly is formed as an imaging surface, the entire surface of which is covered by a cover glass. In FIG. 6, the image sensor IS and the cover glass are shown as a single body. The circuit board 73 is provided, in the vicinity of two diagonally opposite corners thereof, with two circular holes 80, respectively. The circuit board 73 is further provided in the vicinity of the left end thereof with a photographing aperture 81 which is formed through the circuit board 73 in the forward/rearward direction.

The coils 74 and 75, which constitute elements of the electromagnetic actuator, are fixed to the rear surface of the circuit board 73 in the vicinity of the left end thereof. As shown in FIG. 4, each of the coils 74 and 75 is an air-core coil which includes a pair of elongated portions that are substantially parallel to each other and a pair of curved (U-shaped) portions which connect the pair of elongated portions at the respective ends thereof. The coils 74 and 75 are substantially identical in shape and size to each other. The circuit board 73 is further provided at the left end thereof with two sensor support arms 82 and 83. Each of the two sensor support arms 82 and 83 firstly projects rearward and subsequently bends to extend substantially parallel to a plane in which the circuit board 73 lies. An anti-shake sensor 84 is supported by the sensor support arm 82 on the front surface thereof and faces the rear of the coil 74. An anti-shake sensor 85 is supported by the sensor support arm 83 on the front surface thereof and faces the rear of the coil 75.

The board module 13 is mounted to the body module 11 (the housing 16), to which the first lens-group unit 12 is mounted. When the board module 13 is mounted to the body module 11, the front opening of the accommodating recess 18 is closed to make an outer peripheral portion of the rear surface of the circuit board 73 come in contact with the board support surface 27 with the circular holes 80 of the circuit board 73 respectively fitted on the engaging projections 28 of the housing 16 (the front surfaces of the circuit board 73 and the housing 16 substantially lie in a plane). Thereupon, the image sensor IS (cover glass) comes into contact with the packing 23 as shown in FIG. 6, so that the periphery of the imaging surface of the image sensor IS is sealed up by the packing 23. The optical path between the exit surface L12-b of the second prism L12 and the image sensor IS is secured via the through-hole 24 of the packing 23. The first lens element L1 is exposed forward through the photographing aperture 81 of the circuit board 73, and the first lens frame 40 is prevented from coming off forward by a plate surface of the circuit board 73 around the photographing aperture 81.

In the above described mounted state of the board module 13 to the body module 11, the lengthwise direction of the coil 74 is substantially parallel to the magnetic pole boundary line Q1 of the permanent magnet 71 and the lengthwise direction of the coil 75 is substantially parallel to the magnetic pole boundary line Q2 of the permanent magnet 72. The coils 74 and 75 are connected to the printed circuit formed on the rear surface of the circuit board 73. The control of power that is applied to the coils 74 and 75 is performed by a control circuit (not shown). A driving force is generated in a direction substantially orthogonal to the magnetic pole boundary line Q1 of the permanent magnet 71 (i.e., orthogonal to the lengthwise direction of the coil 74) in a plane orthogonal to the optical axis O upon the coil 74 being energized. The direction of action of this driving force is shown by a double-headed arrow F1 in FIGS. 4 and 5. On the other hand, a driving force is generated in a direction substantially orthogonal to the magnetic pole boundary line Q2 of the permanent magnet 72 (i.e., orthogonal to the lengthwise direction of the coil 75) in a plane orthogonal to the optical axis O upon the coil 75 being energized. The direction of action of this driving force is shown by a double-headed arrow F2 in FIGS. 4 and 5. The direction of action of each of the two aforementioned driving forces intersects both the X-axis direction and the Y-axis direction at an angle of approximately 45 degrees, so that the first lens frame 40 can be moved to any arbitrary position in a plane orthogonal to the first optical axis O1 with respect to the base frame 41 (and the body module 11 and the board module 13 that are fixed with respect to the base frame 41) by controlling the passage of current through each of the coils 74 and 75. As described above, the moving range of the first lens frame 40 is limited by engagement of the inner walls of the two movement limit holes 70 with the two movement limit projections 60, respectively.

Each of the two anti-shake sensors 84 and 85 is a magnetic sensor (Hall sensor) and connected to the aforementioned printed circuit that is formed on the rear surface of the circuit board 73. As shown in FIG. 7, when the board module 13 is mounted to the body module 11 and the first lens-group unit 12, the anti-shake sensor 84 enters the anti-shake sensor support portion 55 of the base frame 41 from the rear side to be positioned behind the permanent magnet 71, while the anti-shake sensor 85 enters the anti-shake sensor support portion 56 of the base frame 41 from rear to be positioned behind the permanent magnet 72. Variation in position of the permanent magnet 71 in accordance with movement of the first lens frame 40 that is caused by the electromagnetic actuator causes the output of the anti-shake sensor 84 to vary, while variation in position of the permanent magnet 72 in accordance with movement of the first lens frame 40 that is caused by the electromagnetic actuator causes the output of the anti-shake sensor 85 to vary, and the position of the first lens frame 40 can be detected from the output variations of the two anti-shake sensors 84 and 85.

Assembly of the imaging unit 10 is completed by fixing the front cover 14 and the rear cover 15 to the above described combination of the body module 11, the first lens-group unit 12 and the board module 13. The front cover 14 is a press-molded sheet metal product and is integrally provided with a base 90, an upper and lower pair of engaging lugs 91, an upper and lower pair of engaging lugs 92 and an upper and lower pair of side engaging lugs 93. The base 90 is formed as a planar member orthogonal to the forward/rearward direction. The upper engaging lug 91 and the upper engaging lug 92 extend rearward from the upper edge of the base 90, and the lower engaging lug 91 and the lower engaging lug 92 extend rearward from the lower edge of the base 90. The pair of side engaging lugs 93 extend rearward from the right edge of the base 90. A rectangular engaging hole 91a, a rectangular engaging hole 92a and a rectangular engaging hole 93a are formed through each of the upper and lower engaging lugs 91, each of the upper and lower engaging lugs 92 and each of the side engaging lugs 93, respectively. The base 90 is provided at the right end thereof with three pressure leaves 94 each of which is resiliently deformable in the forward/rearward direction. Each pressure leaf 94 in a free state lies in a plane in which the other part of the base 90 lies. Each pressure leaf 94 is provided in the vicinity of the free end thereof with a pressure projection 94a which projects rearward. The base 90 is provided in the vicinity of the left end thereof with a photographing aperture 95 which is formed therethrough in the forward/rearward direction.

The rear cover 15 is a press-molded sheet metal product and is integrally provided with a base 100, an upper and lower pair of engaging lugs 101, an upper and lower pair of engaging lugs 102, a side engaging lug 103 and a support lug 104. The base 100 is formed as a planar member orthogonal to the forward/rearward direction. The upper engaging lug 101 and the upper engaging lug 102 extend forward from the upper edge of the base 100, and the lower engaging lug 101 and the lower engaging lug 102 extend forward from the lower edge of the base 100. The side engaging lug 103 extends forward from the right edge of the base 100, and the support lug 104 projects from the left end of the base 100. A rectangular engaging hole 101a is formed through each of the upper and lower engaging lugs 101, and a rectangular engaging hole 103a is formed through the side engaging lug 103. As shown in FIG. 7, the support lug 104 is provided with a base portion 105, a pair of upright walls 106 and a pair of sensor support walls 107. The base portion 105 is continuous with and projects leftward from the base 100, the pair of upright walls 106 project forward from the upper and lower ends of the base portion 105, respectively, and the pair of sensor support walls 107 extend vertically in opposite directions away from each other from the front edges of the pair of upright walls 106, respectively. An engaging hole 106a is formed through each upright wall 106. The base frame 41 that constitutes an element of the first lens-group unit 12 is provided with a support protrusion 78 which projects rearward to be fit-engaged into a portion (recessed portion) of the support lug 104 which is surrounded by the base portion 105 and the pair of upright walls 106. The support protrusion 78 is provided on upper and lower sides thereof with two (upper and lower) engaging projections 78a, respectively, which are engaged with the engaging holes 106a of the pair of upright walls 106, respectively.

The front cover 14 is mounted to the front of the board module 13 with a rectangular light shielding sheet 108 held between the front cover 14 and the front of the board module 13. The light shielding sheet 108 can be omitted if sufficient light-tightness can be ensured without the light shielding sheet 108. The front cover 14 is fixed to the housing 16 by making the base 90 cover the circuit board 73 from front while engaging the upper and lower engaging lugs 91 with the upper and lower engaging recesses 29A of the housing 16, respectively, engaging the upper and lower engaging holes 91a of the upper and lower engaging lugs 91 with the upper and lower engaging projections 30 of the housing 16, respectively, and engaging the engaging holes 93a of the upper and lower side engaging lugs 93 with the upper and lower engaging projections 32 of the housing 16, respectively. Additionally, the front cover 14 is fixed to the base frame 41 by engaging the engaging holes 92a of the upper and lower engaging lugs 92 with the upper and lower engaging projections 46 of the base frame 41 while sliding the upper and lower engaging lugs 92 on the upper surface of the upper flange 44 and the lower surface of the lower flange 44, respectively. Upon the front cover 14 fixed to the housing 16, the pressure projection 94a of each pressure leaf 94 comes into contact with a front surface of the circuit board 73 and thereupon a rearward pressing force (biasing force) acts on the front surface of the circuit board 73 from the pressure leaves 94 resiliently deformed slightly forwards, so that the circuit board 73 (the board module 13) is precisely positioned and held at a predetermined position in the forward/rearward direction relative to the housing 16 (the body module 11). The photographing aperture 95 that is formed in the front cover 14 is formed to correspond in position and shape to the photographing aperture 81 of the circuit board 73, so that the photographing aperture 95 is communicatively connected to the photographing aperture 81 and so that the first lens element L1 is exposed toward the front of the imaging unit 10 through the photographing apertures 81 and 95 in a state where the front cover 14 is mounted to the front of the board module 13.

The rear cover 15 is mounted to the rear sides of the body module 11 and the first lens-group unit 12. The rear cover 15 is fixed to the housing 16 by making the base 100 cover the rear side of the housing 16 while engaging each of the upper and lower engaging lugs 101 and each of the upper and lower engaging lugs 102 with the associated engaging recess 29B and the associated engaging recess 29C of the housing 16, respectively, engaging the engaging hole 101a of each engaging lug 101 with the associated engaging projection 31 of the housing 16, and engaging the engaging hole 103a of the side engaging lug 103 of the rear cover 15 with the engaging projection 33 (see FIG. 6) that is formed on the right side of the housing 16. Additionally, as shown in FIG. 7, the rear cover 15 is fixed to the base frame 41 by making the base 100 of the rear cover 15 cover the base frame 41 from rear while engaging the support protrusion 78 of the base frame 41 in the recessed portion of the support lug 104 of the rear cover 15 that is formed by the base portion 105 and the pair of upright walls 106 of the support lug 104 of the rear cover 15, and engaging the upper and lower engaging projections 78a of the support protrusion 78 in the upper and lower engaging holes 106a, respectively. Thereupon, the pair of sensor support walls 107 face the rear surfaces of the sensor support arms 82 and 83 of the circuit board 73 to prevent the sensor support arms 82 and 83 from being deformed rearward. The upper and lower sensor support walls 107 are resiliently deformed to press the sensor support arms 82 and 83 lightly forward to hold the anti-shake sensors 84 and 85 in the anti-shake sensor support portions 55 and 56, respectively. With this structure, each of the anti-shake sensors 84 and 85 is precisely held at a predetermined position.

If the imaging unit 10 that is completely assembled as described above is directed toward an object located in front of the imaging unit 10, light reflected by the object (light emanating from a photographic object) enters the first prism L11 through the incident surface L11-a after passing through the first lens element L1 and is reflected at an angle of 90 degrees by the reflecting surface L11-c of the first prism L11 to travel toward the exit surface L11-b. Subsequently, the reflected light that emerges from the exit surface L11-b of the first prism L11 enters the second prism L12 from the incident surface L12-a after passing through the lens elements L2 through L6, and is reflected at an angle of 90 degrees by the reflecting surface L12-c of the second prism L12 to travel toward the exit surface L12-b. Subsequently, the reflected light that emerges from the exit surface L12-b is captured (received) by the imaging surface of the image sensor IS.

A zooming operation of the imaging optical system is performed by moving the second lens group G2 (the lens elements L4 and L5) and the third lens group G3 (the lens element L6) along the first rod 36 and the second rod 37 using the first motor M1 and the second motor M2. A focusing operation of the imaging optical system is performed by moving the third lens group G3 (the lens element L6) along the first rod 36 and the second rod 37 using the second motor M2. FIG. 8 shows different states of the imaging optical system set at the wide-angle extremity, an intermediate focal length, and the telephoto extremity. When the zooming operation is performed to change the focal length from the wide-angle extremity toward the telephoto extremity, the positions of the first lens group G1, the second prism L12 and the image sensor IS do not vary while the distance (the distance in a direction along the second optical axis O2) between the first lens group G1 and the second lens group G2 gradually decreases. The distance between the second lens group G2 and the third lens group G3 (the distance in a direction along the second optical axis O2) increases from the wide-angle extremity to the intermediate focal length and decreases from the intermediate focal length to the telephoto-extremity.

In the imaging unit 10, an anti-shake (image shake correction/image-stabilizing) operation is performed using the first lens element L1 of the first lens group G1 that is positioned in front of the first prism L11. As described above, the anti-shake system supports the first lens frame 40 in a manner to allow the first lens frame 40 to move relative to the base frame 41, which is fixed with respect to the housing 16, in a plane orthogonal to the first optical axis O1 and drives the first lens frame 40 using the electromagnetic actuator. As shown in FIG. 6, the first lens frame 40 is located on the front side of the imaging unit 10 in the vicinity of the left end thereof. Although the partition wall 19 and the flange support seat 50 of the housing 16 are arranged around the first lens frame 40, the housing 16 is formed to create a predetermined space (clearance) between the housing 16 and the first lens frame 40 to prevent the partition wall 19 and the flange support seat 50 from interfering with the first lens frame 40 even when the first lens frame 40 moves within the moving range defined by the anti-shake system. In addition, the incident surface of the first lens element L1 is substantially flush with the front surface of the base 90 of the front cover 14, with the lens holding portion 63 of the first lens frame 40 inserted into the photographing aperture 81 of the circuit board 73 and the photographing aperture 95 of the front cover 14 as shown in FIG. 6; the size of each photographing aperture 81 and 95 is also set so as not to interfere with the first lens frame 40 even when the first lens frame 40 moves within the moving range defined by the anti-shake system. Accordingly, the first lens frame 40 can reliably be made to perform an anti-shake operation without any interference from any other elements of the imaging unit 10.

The moving direction of the first lens element L1 during an anti-shake operation is orthogonal to the first optical axis O1. Accordingly, the first lens frame 40 that holds the first lens element L1 does not move in the forward/rearward direction that corresponds to the direction of the thickness of the imaging unit 10. In addition, the support mechanism (which is configured of the movement limit projections 60, the ball support holes 61, the ball contact surfaces 66, the guide balls 67, the movement limit holes 70) and the driver (the permanent magnets 71 and 72, the coils 74 and 75) that are for moving the first lens frame 40 relative to the base frame 41 are arranged at positions about the first optical axis O1 which surround the first lens element L1, so that the installation space for the support mechanism and the driver can be small with respect to the forward/rearward direction of the imaging unit 10. Accordingly, the selection of the first lens element L1 as an anti-shake optical element makes it possible to slim down the imaging unit 10 while providing the imaging unit 10 with an anti-shake system. For instance, assuming an anti-shake system which moves the second lens group G2 or the third lens group G3 in directions orthogonal to the second optical axis O2 to cancel out image shake, unlike the present embodiment, allowing room for the second lens frame 34 or the third lens frame 35 and installing the driver for second lens frame 34 or the third lens frame 35 require a greater installation space for the anti-shake system in the housing 16 in the forward/rearward direction than that in the above described illustrated embodiment, thus increasing the thickness of the imaging unit 10.

The first lens element L1 that supports the first lens frame 40 does not need to be connected to the circuit board 73, unlike an electrical component such as the imaging sensor IS, so that the supporting structure for the first lens frame 40 does not become complicated by routing of a flexible wiring board, or a flexible wiring board does not exert resistance on the first lens element L1 during an anti-shake operation.

For instance, unlike the present embodiment, assuming an anti-shake system which moves the image sensor IS in directions orthogonal to the third optical axis O3 to cancel out image shake, the image sensor IS and the circuit board 73 would be connected to each other via a flexible wiring board after the image sensor IS is supported by the circuit board 73. In this case, the flexible wiring board is required to have a sufficient length so as not to provide resistance to movement of the image sensor IS; however, there is not much space around the image sensor IS, so that the flexible wiring board would interfere with other members if the flexible wiring board is made long. To prevent this problem from occurring, if the image sensor IS and the circuit board 73 are spaced from each other in the forward/rearward direction, this spacing becomes in conflict with the slimming down of the imaging unit 10.

The selection of the front lens element(s), corresponding to the first lens element L1, as an anti-shake optical element avoids the above described problems and makes it possible to achieve a simple anti-shake system which contributes to the slimming down of the imaging unit 10. Since only the front lens element(s) that is positioned on the object side of the first prism L11 is driven during the anti-shake control, rather than the entire first lens group G1, there is the advantage that the moving parts of the anti-shake system can be made compact and the driving load thereon can be small. Note that, in the illustrated embodiments, although only the first lens element (anti-shake optical element) L1 is provided on the object side of the first prism L11, the anti-shake optical element is not limited to one lens element, the present invention can also be applied to a configuration in which a plurality of lens elements (anti-shake optical elements) provided on the object side of the first prism L11 are driven to perform anti-shake control. Therefore, although the description hereinbelow describes a configuration in which only the first lens element L1 is described as the first lens element, a configuration in which a plurality of lens elements are driven (moved) to perform anti-shake control is also applicable by replacing the term "first lens element L1" with "front lens elements".

In typical anti-shake systems, if only a lens element of (or part of) a lens group is driven in directions orthogonal to an optical axis, the aberration of the photographing optical system deteriorates, which may cause the photographing optical system to become impractical to use. In this connection, since the first prism L11 that operates only to reflect the incident light rays is disposed between the front lens element (first lens element L1) used for anti-shake operation and the second lens element L2 (that are optical elements having refractive power) in the first lens group G1 in the present embodiment, the distance between the front lens element (first lens element L1) and the second lens element L2 is great, so that the deterioration in aberration is small even if the front lens element (first lens element L1) is solely moved to perform anti-shake control. Accordingly, a satisfactory optical performance can be secured for an anti-shake operation even if the front lens element (first lens element L1) and the second lens element L2, which are spaced far from each other in the optical axis direction with the first prism L11 positioned therebetween, are treated as different lens groups, even though the aberration is controlled over the entire first lens group G1, which extends from the front lens element (first lens element L1) to the third lens element L3, as a part of a zoom lens system; hence, only the front lens element that is positioned on the object side of the first prism L11 is set as an optical element used for anti-shake operation in the present embodiment.

Unlike telescopic lens barrels in which the length in an optical axis direction (the distance between the image plane and the lens element closest to the object side) varies when a zooming operation or a barrel retracting operation is performed, the length of the optical path from the incident surface of the front lens element (first lens element L1) to the image plane (the imaging surface of the image sensor IS) in the imaging unit 10 is constant at all times. Therefore, it is possible to embed the imaging unit 10 into a mobile electronic device and cover the front of the front lens element (first lens element L1) with a protection glass or the like, and no practical problem arises even if the front lens element (first lens element L1), of the optical system of the imaging unit 10, that is located closest to the object side is driven to cancel out image shake.

In the optical configuration in which the front lens element is used as an anti-shake optical element, it is desirable that optical conditions which will be discussed hereinafter be satisfied. Note that optical conditions will be hereinafter described based on a configuration in which only one first lens element L1 is provided in front (on the object side) of the first prism L11, however the optical conditions are also applicable to a configuration in which a plurality of lens elements (anti-shake optical elements/first lens elements L1) are provided in front (on the object side) of the first prism L11, as mentioned above.

First, it is required to secure a sufficient distance (amount of clearance) between the first lens element L1 and the first prism L11 to prevent the first lens element L1 and the first prism L11 (or the first lens frame 40 and the base frame 41) from interfering with each other when the first lens element L1 is moved in directions orthogonal to the first optical axis O1. On the other hand, if the distance between the first lens element L1 and the first prism L11 is made excessively large, the size of the imaging unit 10 in the direction of the thickness thereof (the forward/rearward direction) becomes great. Accordingly, it is required to determine the distance between the first lens element L1 and the first prism L11 while taking the balance between this distance and the size of the imaging unit 10 into account.

Figure 10:
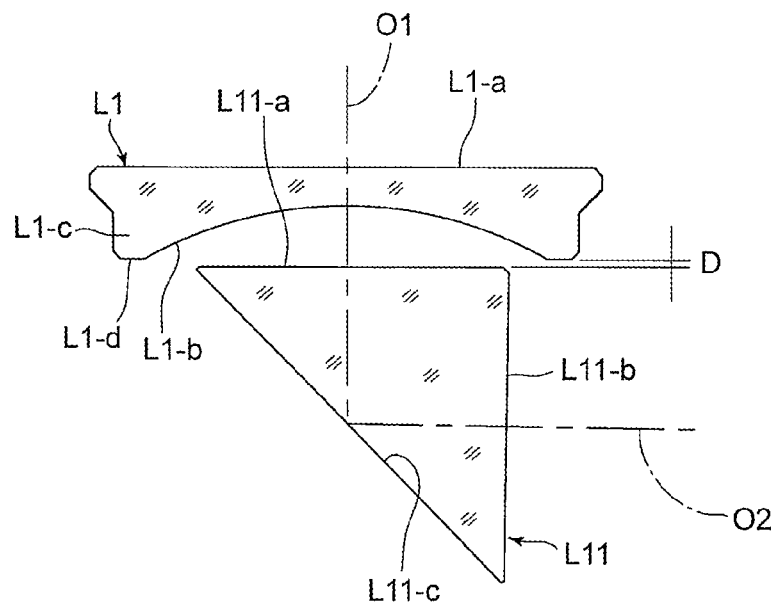
FIG. 10 is a cross sectional view of a first lens element and a first prism that are arranged along a first optical axis and serves as elements of the imaging optical system in each of the above described embodiments of the imaging units.

As shown in FIG. 10, the first lens element L1 is provided with an incident surface L1-$a$ which faces the object side and a concave surface L1-$b$, constituting an exit surface, which is located on the image plane side. The concave surface L1-$b$ is an effective optical surface of the first lens element L1 that is located on the image surface side, and the first lens element L1 is provided around the concave surface L1-$b$ with a rim L1-$c$. A rear end surface L1-$d$ of the rim L1-$c$ is a portion of the first lens element L1 which is the closest to the incident surface L11-$a$ of the first prism L11. The rear end surface L1-$d$ of the first lens element L1 is a flat surface which lies in a plane substantially orthogonal to the first optical axis O1. It is desirable that the following condition (1) be satisfied:

$$1 < D/S1 < 10 \qquad (1),$$

wherein D designates the distance between the rear end surface L1-$d$ and the incident surface L11-$a$ in the direction along the first optical axis O1 (see FIG. 10), and S1 designates the amount of movement of the first lens element L1 when the shake correction angle is 0.5 degrees.

The amount of movement of the first lens element L1 when the shake correction angle is 0.5 degrees is determined by the focal length of the first lens element L1. Since the focal length of the first lens element L1 is determined according to the overall structure of the imaging optical system, the focal length of the first lens element L1 results in being selectively determined based on the balance between the focal length of the first lens element L1 and the entire size of the imaging unit 10 that accommodates an imaging optical system. Accordingly, by setting the distance between the first lens element L1 and the first prism L11 to a value which satisfies condition (1) with reference to the amount of movement of the first lens element L1, it is possible to secure a required distance between the first lens element L1 and the first prism L11 while taking the balance between this distance and the entire size of the imaging unit 10 into account. More specifically, if the value D/S1 in condition (1) is equal to or greater than the upper limit (=10), the distance between the first lens element L1 and the first prism L11 becomes excessively great, which becomes an obstacle to the slimming down (reduction in size in the forward/rearward direction) of the imaging unit 10. If the value D/S1 in condition (1) is equal to or smaller than the lower limit (=1), the distance between the first lens element L1 and the first prism L11 becomes excessively small, which may cause the first lens element L1 and the first prism 11, or the first lens frame 40 and the base frame 41 to interfere with each other during an anti-shake operation. Although the rear end of the first lens element L1 is formed as the rear end surface L1-d that is a flat surface substantially orthogonal to the first optical axis O1 in the above illustrated embodiments, condition (1) is also effective in a structure in which the rear end of the first lens element L1 does not have such a flat surface.

If a plurality of front lens elements are provided, the "D" in condition (1) is the distance from the rear end of the front lens element that is provided closest to the image side (closest to the first prism L1) to the incident surface L11-a of the first prism L11.

Table 1 shows the numerical values of the first through fourth embodiments, which satisfy condition (1):

TABLE 1

|  | S1 [mm] | D [mm] | D/S1 |
|---|---|---|---|
| Embod. 1 | 0.062 | 0.150 | 2.419 |
| Embod. 2 | 0.075 | 0.236 | 3.147 |
| Embod. 3 | 0.053 | 0.238 | 4.491 |
| Embod. 4 | 0.091 | 0.281 | 3.088 |

As can be understood from Table 1, in regard to condition (1), it is further desirable for the condition 1<D/S1<6 to be satisfied.

In addition, it is desirable for the maximum amount of movement of the first lens element L1 for image shake correction to be determined in consideration of the optical performance and the magnitude of the imaging unit 10. Accordingly, it is desirable for the following condition (2) to be satisfied:

$$|S/Y|<0.2 \qquad (2),$$

wherein S designates the maximum amount of movement of the first lens element L1 along a plane orthogonal to the first optical axis O1 (the maximum amount of movement of the first lens frame 40 that is mechanically limited by the two movement limit projections 60 and the two movement limit holes 70), and Y designates the diagonal image height on the image sensor IS.

Figure 11:
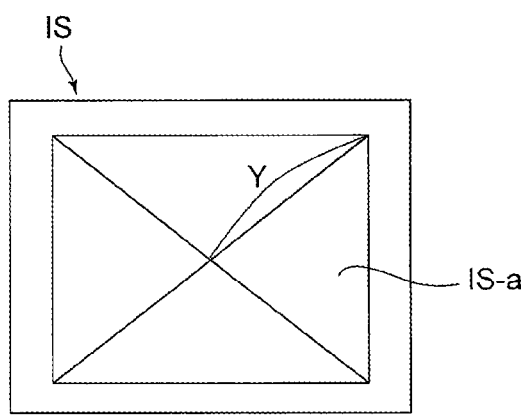
FIG. 11 is an elevational view of the image sensor shown in FIGS. 2, 4, 6 and 9, viewed from the light-receiving surface side.

As shown in FIG. 11, the diagonal image height Y denotes the length of one half of a diagonal line of the effective light receiving area IS-a of the image sensor IS.

If condition (2) is not satisfied, the amount of movement of the first lens element L1 during an anti-shake operation becomes excessively great, consequently exceeding a range in which deterioration of optical performance and reduction of brightness at the edge of image field are allowable. Additionally, if condition (2) is not satisfied, it is required to secure a large space for movement of the first lens element L1 because the first lens element L1 also mechanically moves, which increases the size of the imaging unit 10. If condition (2) is satisfied, optical performance does not easily deteriorate while the imaging unit 10 can be prevented from being enlarged.

Table 2 shows the numerical values of the first through fourth embodiments, which satisfy condition (2):

TABLE 2

|  | S [mm] | Y [mm] | |S/Y| |
|---|---|---|---|
| Embod. 1 | 0.370 | 2.856 | 0.13 |
| Embod. 2 | 0.451 | 3.600 | 0.13 |
| Embod. 3 | 0.320 | 2.856 | 0.11 |
| Embod. 4 | 0.546 | 2.856 | 0.19 |

Figure 9:
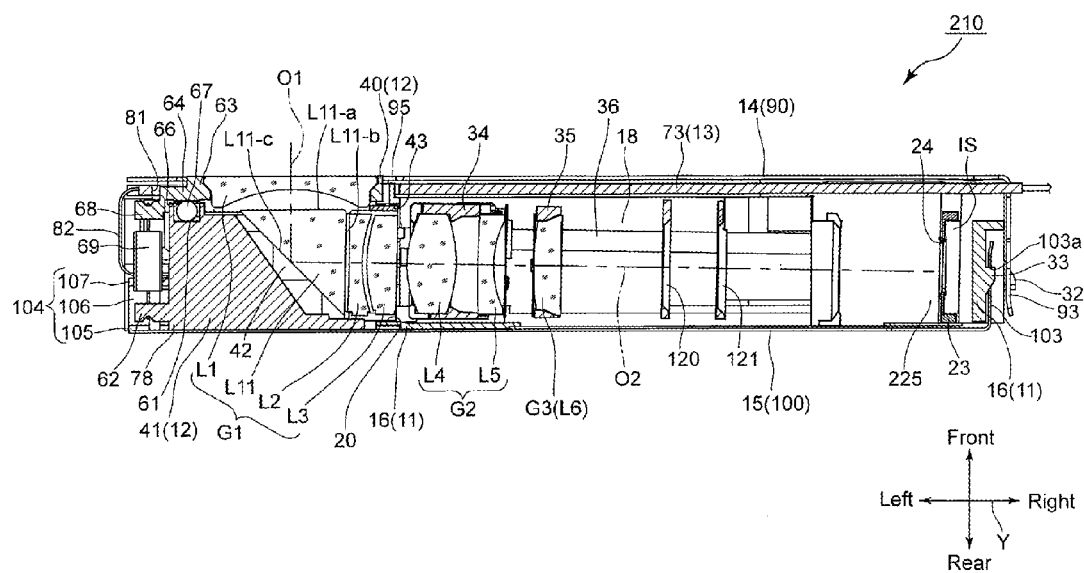
FIG. 9 is a view similar to that of FIG. 6, showing another embodiment of the imaging unit which is not provided in the imaging optical system thereof with the second prism that the previous embodiment of the imaging unit has.

The present invention can also be applied to a type of imaging optical system like an imaging unit 210 shown in FIG. 9 that includes no reflector such as a prism between a movable lens group (the second lens group G2 and the third lens group G3) and the image sensor IS. In the imaging unit 210 shown in FIG. 9, a sensor support space 225 is formed at a position corresponding to the position at which the prism mounting recess 25 is formed in the previous embodiment of the imaging unit 10, and the image sensor IS is installed in the sensor support space 225 so that the imaging surface of the imaging sensor IS faces leftward. The image sensor IS lies on the second optical axis O2, and the light rays emerging from the third lens group G3 (the sixth lens element L6) are incident on the image sensor IS without being reflected. Also in the imaging unit 210 that includes such an L-shaped optical path, the above described effects are obtained by making the first lens element L1 serve as an anti-shake optical element. In the imaging unit 210 in particular, if the image sensor IS is made to serve as an anti-shake optical element, the possibility of the housing 16 increasing in size in the forward/rearward direction is great, similar to the case where the second lens group G2 or the third lens group G3 is made to serve as an anti-shake optical element, and accordingly, the present invention is suitable for achieve the slimming down of the imaging unit 210 (reduction in size in the forward/rearward direction).

Figure 12:
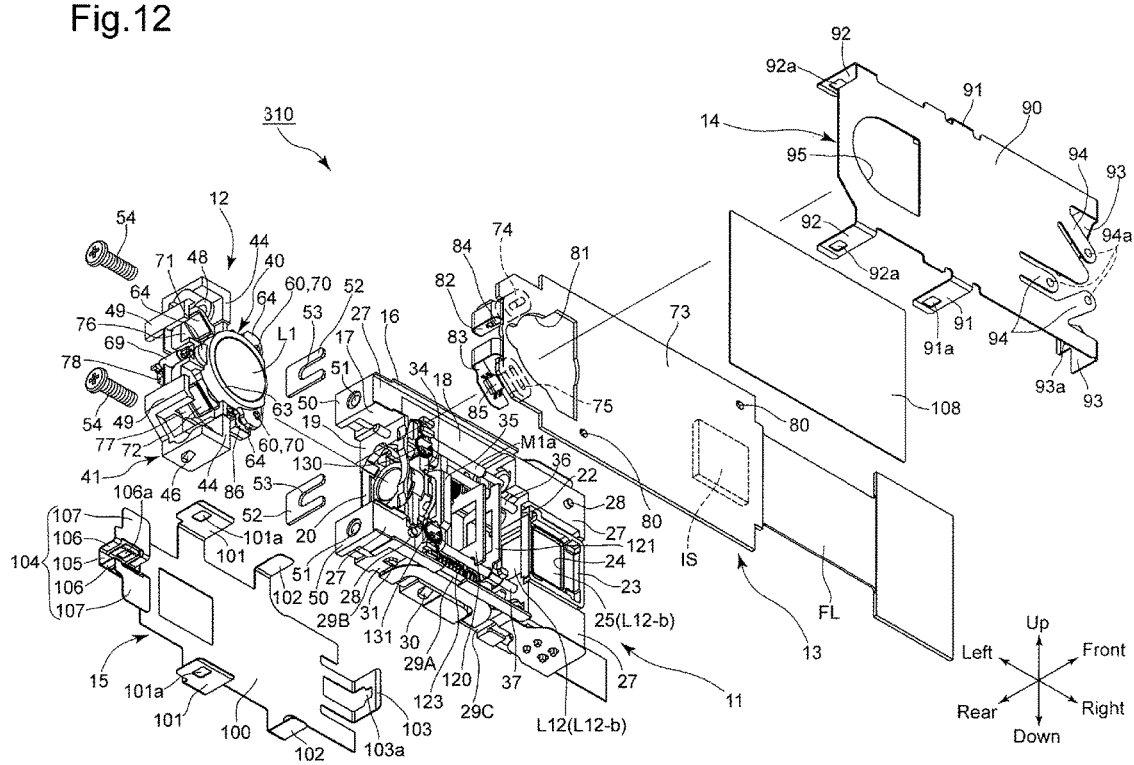
FIG. 12 is a view similar to that of FIG. 2, illustrating another embodiment of the imaging unit in which the mechanism which supports a first lens frame for the first lens element in a manner to allow the first lens frame to move is different from that provided in each of the previous embodiments of the imaging units.
Figure 13:
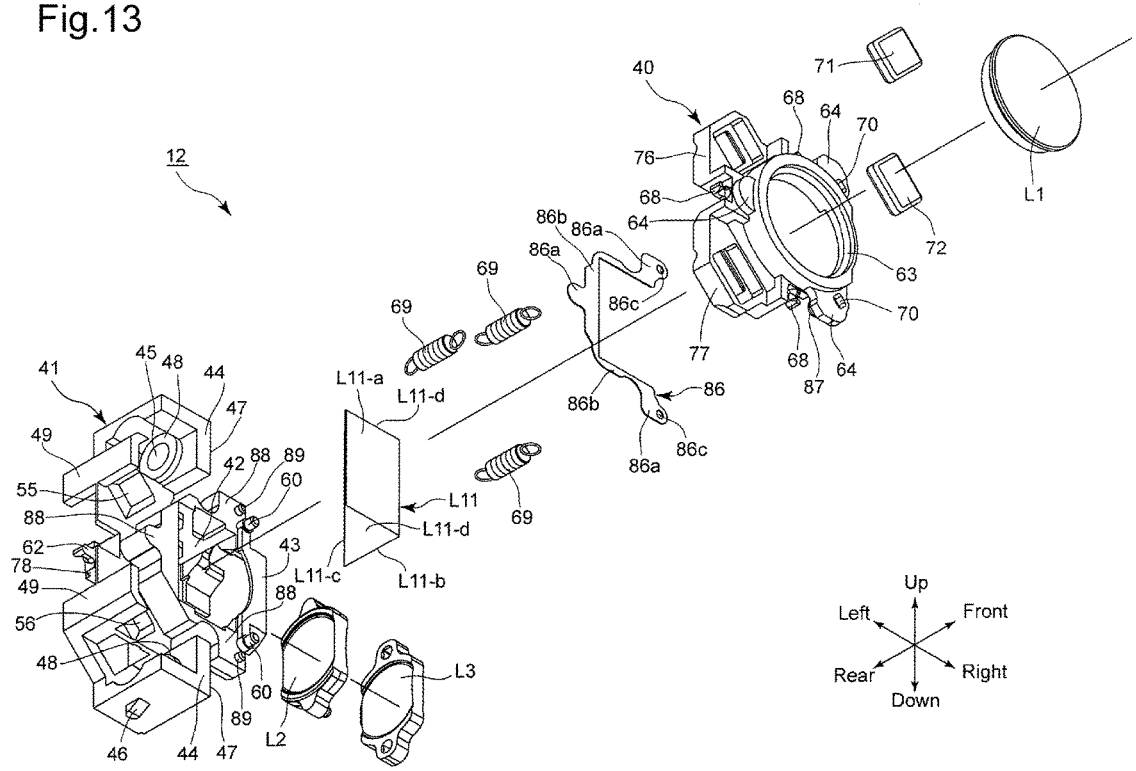
FIG. 13 is a view similar of that of FIG. 3, illustrating the first lens-group unit that constitutes part of the imaging unit shown in FIG. 12.
Figure 14:
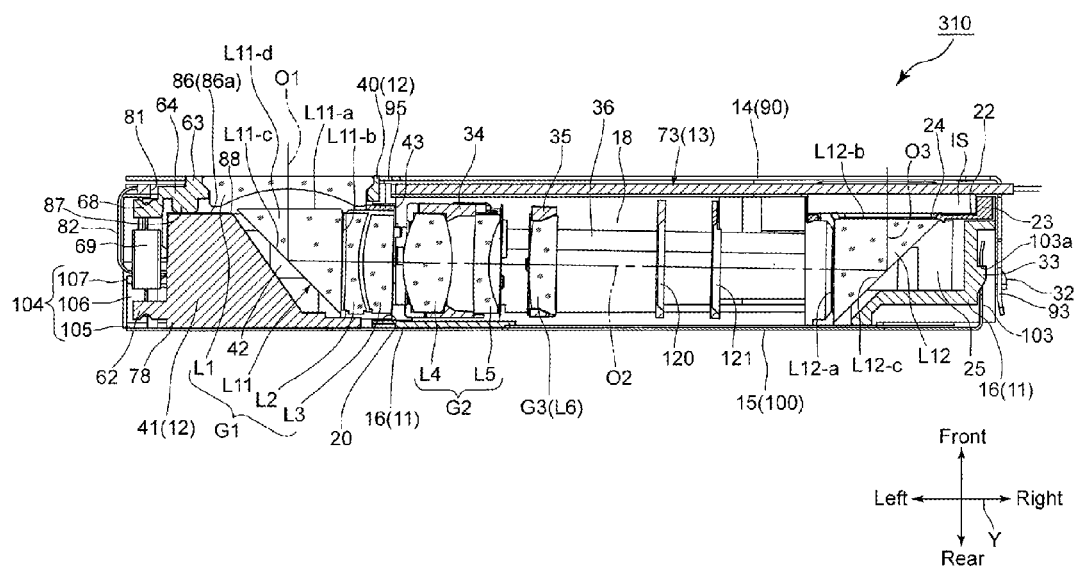
FIG. 14 is a cross sectional view, similar to those shown in FIGS. 6 and 9, of the imaging unit shown in FIG. 12 that is taken along a second optical axis.

FIGS. 12 through 14 show another embodiment of the imaging unit. The mechanism which makes the base frame 41 support the first lens frame 40 in a manner to allow the first lens frame 40 to move in the imaging unit 310 is different from that provided in each of the previous embodiments of the imaging units. The three guide balls 67 are held between the first lens frame 40 and the base frame 41 in each of the above described imaging units 10 and 210, whereas a sliding sheet 86 is held between the first lens frame 40 and the base frame 41 in the imaging unit 310. As shown in FIGS. 13 and 14, a sliding projection 87 is formed on each of the three flanges 64 of the first lens frame 40 to project rearward, i.e., in a direction to approach the base frame 41 (note that only one sliding projection 87 appears in each of FIGS. 13 and 14). The rear ends of the three sliding projections 87 are formed as surfaces lying in a plane orthogonal to the first optical axis O1. The base frame 41 is provided, at three positions respectively facing the flanges 64 of the first lens frame 40, with three support surfaces 88 which lie in a plane orthogonal to the first optical axis O1. The base frame 41 is provided, on two of the three support surfaces 88 which are positioned on the vertically opposite sides of the prism mounting recess 42, with two positioning projections 89, respectively. As shown in FIG. 13, the sliding sheet 86 is a thin plate member which is substantially U-shaped in a front view, including three contact portions 86a and a frame-shaped connecting portion 86b which connects the three contact portions 86a. The sliding sheet 86 is made of a material having a low skin friction resistance (e.g., polytetrafluoroethylene). The sliding sheet 86 is provided with two positioning holes 86c, in which the positioning projections 89 of the base frame 41 are engaged. In a state where the sliding sheet 86 is positioned by engagement between the positioning projections 89 and the positioning holes 86c, each contact portion 86a is held between the first lens frame 40 and the base 41 by the biasing force of the extension springs 69 while being sandwiched from between the sliding projection 87 of the associated flange 64 of the first lens frame 40 and the associated support surface 88 of the base frame 41.

In the imaging unit 310, the first lens frame 40 can be driven smoothly relative to the base frame 41 to reduce image shake by sandwiching the low slide-resistant sliding sheet 86 between the first lens frame 40 and the base 41, similar to the above described case using the three guide balls 67. Since the sliding sheet 86 consists of a single member including the three contact portions 86a and the frame-shaped connecting portion 86b that connects the three contact portions 86a, the number of elements is small, so that the sliding sheet 86 can be easily installed. In addition, the sliding sheet 86 is in the shape of a thin plate, which makes it easy to slim down the camera (reduce the size of the camera in the forward/rearward direction). The structure in which the sliding sheet 86 is sandwiched between the three sliding projections 87 and the three support surfaces 88 also has the advantage of not requiring the first lens frame 40 or the base frame 41 to have a complicated shape.

Although the present invention has been described based on the above illustrated embodiments, the present invention is not limited solely thereto; various modifications to the above illustrated embodiments is possible. For instance, although the base frame 41 is formed as a separate member from the housing 16 in the above illustrated embodiments of the imaging units, it is possible to provide a single support member which corresponds to a combination of the base frame 41 and the housing 16 and to make this single support member support all the optical elements except the first lens element L1.

Although a modified embodiment of the optical system which is arranged extending toward the object side from the first lens group G1 and which does not include the second prism has been illustrated with reference to FIG. 9, still another modified embodiment of the same optical system can also be adopted. For instance, although the second lens group G2 and the third lens group G3 are lens groups which are supported to be movable on the second optical axis O2 in the above illustrated embodiments, the present invention can also be applied to another type of imaging optical system which includes more than two movable lens groups on the second optical axis O2.

In addition, it is possible to change the number of lenses installed in front of (on the object side) or behind (on the image plane side) the first prism L11 in the first lens group G1.

As described above, the first lens element L1 in the above illustrated embodiments can be replaced by two or more than two front lens elements which are arranged in front of the first prism L11. In this case, the distances between the front lens elements installed in front of the first prism L11 are small, and accordingly, to prevent the aberration from deteriorating it is advisable to perform anti-shake control by moving all the plurality of front lens elements that are arranged in front of the first prism L11 in directions orthogonal to the first optical axis O1. However, if a lens element of the plurality of front lens elements has an extremely weak refractive power so as not to influence aberrations, a configuration is possible in which such a weak powered lens element is not moved during anti-shake control. Furthermore, it is also possible to provide the plurality of front lens elements as a cemented lens, or a hybrid lens formed from glass and plastic lens materials.

Additionally, although the second lens element L2 and the third lens element L3 are arranged behind the first prism L11 in the above illustrated embodiments, the number of lens elements arranged behind the first prism L11 in the first lens group G1 can be one or more than two. Additionally, it is possible to modify the first G1 so that no lens element is provided behind the first prism L11.

As mentioned above, the length of the optical path from the incident surface of the first lens element L1 to the image plane in the imaging unit 10 (210, 310) is constant at all times in the above described embodiments. In this type of imaging optical system, the first lens element L1 that is the closest to the object side is generally a negative lens. However, the lens (front lens element) for use in anti-shake control in the imaging apparatus according to the present invention can be a positive lens. Regardless of whether the power of the front lens element is negative or positive, any lens element can be adopted as the front lens as long as it has a refractive power. In the case where the surface on the image side of the front lens element is a convex surface, the distance from the reflector (the incident surface L11-a of the first prism L11) to the rear end of the rim or the apex of the convex surface, whichever is closest to the reflector, of such a front lens element is "D" of condition (1).

Furthermore, in the illustrated embodiments, although the amount of movement of the first lens element L1 along a plane orthogonal to the optical axis (corresponding to "S" in condition (2)) is determined by the movement limit projections 60 and the movement limit holes 70, the mechanism for mechanically determining "S" in condition (2) is not limited to the configuration described in the embodiments, alternative mechanisms, etc., are possible.

Additionally, although the imaging optical system of the above illustrated embodiment of the imaging unit 10 (210, 310) is a zoom lens (variable power optical system) which performs a zooming operation by moving the second lens group G2 and the third lens group G3 along the second optical axis O2, the present invention is also applicable to an imaging apparatus which incorporates an imaging optical system having no power varying capability. For instance, it is possible to modify the imaging unit 10 (210, 310) such that the second lens group G2 and the third lens group G3 do not move for a zooming operation and that the second lens group G2 or the third lens group G3 moves solely for a focusing operation.

Additionally, although the photographing optical system in each of the above described embodiments of the imaging units uses at least one prism as a reflector that bends an optical path, the prism can be replaced by a different type of reflector such as a mirror. Additionally, the bending angle (reflection angle) of an optical axis by the reflector can be an angle other than 90 degrees.

Although the three extension springs 69 are used to couple the first lens frame 40 to the base frame 41 in each of the above described embodiments of the imaging units, the number of the extension springs 69 can be changed. For instance, each of the above described embodiments of the imaging units can be modified to use only two extension springs 69. Additionally, in the case where the first lens frame 40 is securely prevented from coming off the base plate 41 forward and where sufficient clearance can be secured between the first lens frame 40 and the front cover 14, each of the above described embodiments of the imaging units can be modified so that it has no biaser like the extension springs 69.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
   a front lens group, which constitutes part of an imaging optical system of said imaging apparatus, provided at a fixed position with respect to an optical axis direction, wherein said front lens group includes at least one front lens element, and a reflector, in that order from an object side, wherein said reflector reflects light rays exiting from said front lens element;
   a movable lens group, which constitutes another part of said imaging optical system, provided closer to the image plane side than said front lens group and movable along the optical axis;
   a support which supports at least said reflector of said front lens group;
   a movable frame which supports said front lens element of said front lens group and is supported by said support to be movable to reduce image shake on said image plane;
   a front cover which is fixed to said support and comprising a photographing aperture such that said light rays enter said at least one front lens element through said photographing aperture; and
   a driver which drives said movable frame, in accordance with vibrations applied to said imaging optical system, to reduce image shake on said image plane, wherein at least said reflector is stationary relative to said movable frame during driving of said movable frame by said driver;
   wherein the size of said photographing aperture is set so as not to interfere with said movable frame even when said movable frame moves within the moving range to reduce image shake.

2. The imaging apparatus according to claim 1, wherein said front lens group comprises at least one rear lens element onto which said light rays reflected by said reflector are incident.

3. The imaging apparatus according to claim 1, wherein said front lens element of said front lens group has negative refractive power.

4. The imaging apparatus according to claim 1, wherein said imaging optical system comprises a zoom lens system which varies a focal length thereof by moving said movable lens group in said optical axis direction.

5. The imaging apparatus according to claim 1, wherein said front lens group has a negative refractive power and wherein said movable lens group comprises a second lens group having a positive refractive power and a third lens group having a positive refractive power, in that order from said object side.

6. The imaging apparatus according to claim 1, wherein said reflector of said front lens group comprises a prism.

7. The imaging apparatus according to claim 1, wherein the following condition (1) is satisfied:

$$1 < D/S1 < 10 \qquad (1),$$

wherein D designates the distance between said front lens element and said reflector in said optical axis direction, and S1 designates an amount of movement of said front lens element when a shake correction angle is 0.5 degrees.

8. The imaging apparatus according to claim 1, further comprising a second reflector which is provided between said movable lens group and said image plane and reflects light rays, exiting from said movable lens group, toward said image plane.

9. The imaging apparatus according to claim 1, further comprising an image sensor which lies on said image plane.

* * * * *